US012551565B2

(12) United States Patent
Yuan et al.

(10) Patent No.: US 12,551,565 B2
(45) Date of Patent: Feb. 17, 2026

(54) CD44 TARGETED MULTI-ARM CONJUGATE

(71) Applicant: BrightGene Bio-Medical Technology Co., Ltd., Jiangsu (CN)

(72) Inventors: Jiandong Yuan, Jiangsu (CN);
Yangqing Huang, Jiangsu (CN);
Yunsong Song, Jiangsu (CN)

(73) Assignee: BrightGene Bio-Medical Technology Co., Ltd., Jiangsu (CN)

( * ) Notice: Subject to any disclaimer, the term of this patent is extended or adjusted under 35 U.S.C. 154(b) by 354 days.

(21) Appl. No.: 17/431,541

(22) PCT Filed: Feb. 17, 2020

(86) PCT No.: PCT/CN2020/075578
§ 371 (c)(1),
(2) Date: Aug. 17, 2021

(87) PCT Pub. No.: WO2020/169004
PCT Pub. Date: Aug. 27, 2020

(65) Prior Publication Data
US 2022/0096644 A1  Mar. 31, 2022

(30) Foreign Application Priority Data

Feb. 22, 2019 (CN) .......................... 201910131331.1

(51) Int. Cl.
| A61K 47/00 | (2006.01) |
| A61K 31/4745 | (2006.01) |
| A61K 47/55 | (2017.01) |
| A61K 47/60 | (2017.01) |
| A61K 47/64 | (2017.01) |
| A61P 35/00 | (2006.01) |
| C08G 65/333 | (2006.01) |

(52) U.S. Cl.
CPC .......... *A61K 47/60* (2017.08); *A61K 31/4745* (2013.01); *A61K 47/55* (2017.08); *A61K 47/64* (2017.08); *A61P 35/00* (2018.01); *C08G 65/33396* (2013.01)

(58) Field of Classification Search
CPC .... A61K 47/60; A61K 31/4745; A61K 47/55; A61K 47/64; A61K 31/437; A61P 35/00; C08G 65/33396; C08G 65/333
See application file for complete search history.

(56) References Cited

U.S. PATENT DOCUMENTS

| 8,927,694 B2 * | 1/2015 | McDonagh | .......... | C07K 14/765 |
| | | | | 530/350 |
| 2011/0053864 A1 | 3/2011 | Finlayson et al. | | |
| 2015/0190529 A1 | 7/2015 | Peterson et al. | | |

FOREIGN PATENT DOCUMENTS

| CA | 3024371 A1 | 11/2017 |
| CA | 3058029 A1 | 10/2018 |
| CN | 101609298 A | 12/2009 |
| CN | 103608733 A | 2/2014 |
| CN | 104906076 A | 9/2015 |
| CN | 108727583 A | 11/2018 |
| JP | 2009539367 A | 11/2009 |
| JP | 2014514330 A | 6/2014 |
| JP | 201579243 A | 4/2015 |
| JP | 2017132743 A | 8/2017 |
| WO | 2005/028539 A2 | 3/2005 |
| WO | 2010/019233 A1 | 2/2010 |
| WO | 2011063156 A2 | 5/2011 |
| WO | 2011063158 A1 | 5/2011 |
| WO | 2011109678 A1 | 9/2011 |
| WO | 2014148562 A1 | 9/2014 |
| WO | 2014157113 A1 | 10/2014 |
| WO | 2015196944 A1 | 12/2015 |

OTHER PUBLICATIONS

Design, synthesis and antitumor activity of a novel PEG-A6-conjugated irinotecan derivative, Yang-Qing Huang, et al., Contents lists available at ScienceDirect Bioorganic & Medicinal Chemistry Letters, journal homepage: www.elsevier.com/locate/bmcl, Oct. 9, 2019, 5 pages.

Tunable conjugation densities of camptothecin on hyaluronic acid for tumor targeting and reduction-triggered release, Zhoujiang Chen, et al., Contents lists available at ScienceDirect Acta Biomaterialia, journal homepage: www.elsevier.com/locate/actabioma <http://www.elsevier.com/locate/actabioma>, 2016, 13 pages.

Stemness and Including Differentiation of Small Cell Lunch Cancer NCI-H446 Cells, Z Zhang, et al., Cell Death and Disease, 2013, vol. 4, e633, p. 1-13.pdf, 13 pages.

Expression of CD44 CD24 and ESA in pancreatic adenocarcinoma cell lines varies with local microenvironment, Expression of CD44 CD24 and ESA in pancreatic adenocarcinoma cell lines varies with local microenvironment.pdf, 8 pages.

(Continued)

*Primary Examiner* — Jeanette M Lieb
(74) *Attorney, Agent, or Firm* — Young Basile Hanlon & MacFarlane, P.C.

(57) ABSTRACT

Disclosed is a class of multi-branched drug conjugates capable of specifically targeting CD44. The class of compounds specifically binds to CD44, and may target tumor cells and tissues having high expression of CD44, so that the concentration of the conjugate in a target tissue is high, the clinical treatment effect thereof is improved, and toxicity is reduced. The compound of the present invention is suitable for treating all tumors having high expression of CD44, comprising but not limited to gastric cancer, pancreatic cancer, small cell lung cancer, colon cancer, breast cancer, lung adenocarcinoma, liver cancer, nasopharyngeal carcinoma, malignant glioma, lymphoma, renal carcinoma, ovarian cancer, head and neck cancer, squamous cell carcinoma, and the like.

20 Claims, No Drawings

Specification includes a Sequence Listing.

(56) References Cited

OTHER PUBLICATIONS

Hyaluronic acid-nimesulide conjugates as anticancer drugs against CD44-overexpressing, Hyaluronic acid-nimesulide conjugates as anticancer drugs against CD44-overexpressing.pdf, 20 pages.
Indentification of Gastric Cancer Stem Cells Using the Cell Surface Marker CD44, Indentification of Gastric Cancer Stem Cells Using the Cell Surface Marker CD44.pdf, 16 pages.
Zhoujiang Chen, Tunable conjugation densities of camptothecin on hyaluronic acid for tumor targeting and reduction-triggered release, Acta Biomaterialia 43 (2016) 195-207, 13 pages.

* cited by examiner

CD44 TARGETED MULTI-ARM CONJUGATE

CROSS REFERENCE TO RELATED APPLICATIONS

This application is a National Stage Entry under the provisions of 35 USC 371 of Application PCT/CN2020/075578 which has an international filing date of Feb. 17, 2020. Application PCT/CN2020/075578 claims priority from Application 201910131331.1 filed on Feb. 22, 2019 in China. The entire contents of these applications are incorporated herein by reference in their entirety.

TECHNICAL FIELD

This disclosure relates to relates generally to a multi-arm targeting conjugate. In particular, the present invention relates to a multi-arm conjugate in which a CD44-targeted molecule and an anticancer agent provide a synergistic effect.

BACKGROUND

In recent years, malignant tumors have shown an obvious upward trend in both mortality and morbidity and have posed a serious threat to human health.

CD44 is a group of integral membrane glycoproteins with a wide distribution and various molecular forms, comprising an extracellular region, a transmembrane region and a membrane-proximal region. CD44 is a type I transmembrane glycoprotein that firstly binds hyaluronic acid to trigger intracellular signaling pathways, in turn leading to a series of cell reactions including shedding, metastasis, and invasion. CD44, a member of a family of cell adhesion molecules, plays an important role in regulating the adhesion and bonding between cells and between cells and extracellular matrix, which is very important for maintaining the integrity of tissue structures. CD44 can also transmit intracellular signals and regulate the occurrence, activity, etc. of tumor cells, such as breast cancer cells and colorectal cancer cells. At present, a large number of studies have shown that CD44 is closely related to the occurrence, development, invasion, and metastasis of tumors, and is often expressed at an early stage of tumor occurrence, wherein the difference of the expression becomes more significant with the development of tumors, and for example, CD44 is expressed in some precancerous lesions.

The term "CD44-targeted polypeptide" refers to a polypeptide capable of targeting and binding to CD44. Typically, "CD44-targeted polypeptides" include polypeptides with the following structures: Ac-KPSSPPEE-NH$_2$ and Ac-NASAP-PEE-NH$_2$. The above-mentioned two polypeptides have a certain sequence homology with part of the link domain of CD44, and are capable of targeting and binding to CD44.

Specifically, the polypeptide with the structure of Ac-KPSSPPEE-NH$_2$ is also called A6 polypeptide and the structure of A6 is as follows:

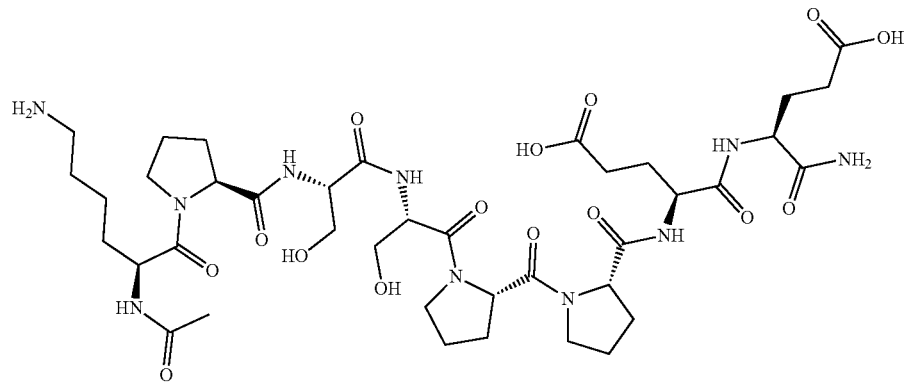 [SMILES: CC(=O)N[C@@H](CCCCN)C(=O)N1CCC[C@H]1C(=O)N[C@@H](CO)C(=O)N[C@@H](CO)C(=O)N1CCC[C@H]1C(=O)N1CCC[C@H]1C(=O)N[C@@H](CCC(=O)O)C(=O)N[C@@H](CCC(=O)O)C(N)=O]

and the polypeptide with the structure of Ac-NASAPPEE-NH$_2$ is as follows:

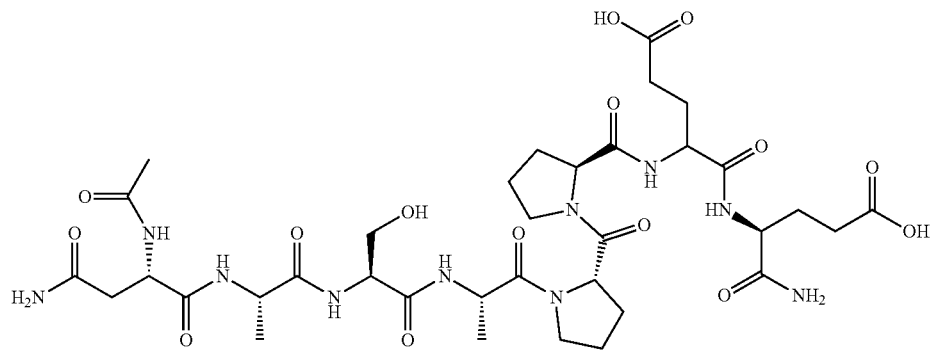 [SMILES: CC(=O)N[C@@H](CC(N)=O)C(=O)N[C@@H](C)C(=O)N[C@@H](CO)C(=O)N[C@@H](C)C(=O)N1CCC[C@H]1C(=O)N1CCC[C@H]1C(=O)NC(CCC(=O)O)C(=O)N[C@@H](CCC(=O)O)C(N)=O]

WO 2005028539, WO 2010019233, WO 2011063156 and WO 2011063158 disclose a drug nktr-102 from Nektar Therapeutics, which is in clinical phase 3 development and mainly used for metastatic breast cancers. This drug is a water-soluble, multi-branched polymer prodrug and has the following structure for achieving improved drug loading:

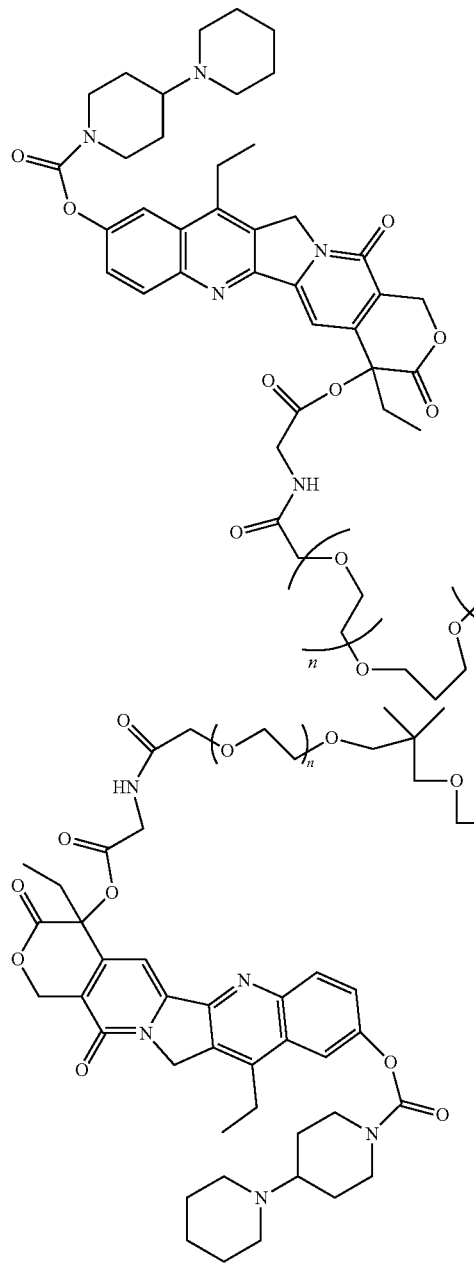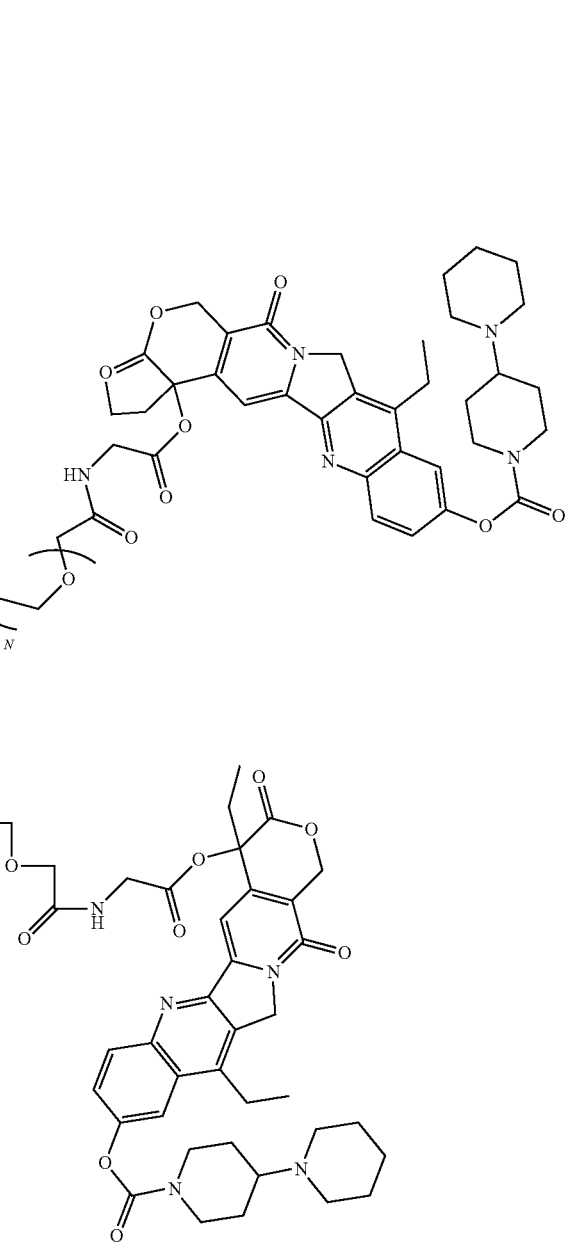

By connecting a multi-arm PEG to irinotecan, the compound may have an increased water solubility, an improved drug loading, and a reduced side effect without impacting anti-cancer effects. However, this drug still has shortcomings, for example, it has a poor targeting capability and cannot act on specific cancer cells, and when killing cancer cells, it may also influence the properties of normal cells, which leads to a relatively high incidence of adverse effects.

Chinese Patent Application CN 108727583 A discloses a multi-arm, polymer-modified, targeting anti-cancer conjugate, which is a class of compounds exhibiting a high loading capacity and has a targeting capability, so that the concentration of the conjugate in a target tissue is high. However, due to abnormalities in the structure, function and metabolism of malignant tumor cells, the cells may divide and proliferate indefinitely and in a disorderly manner, and are thus very difficult to remove. Therefore, it is necessary for pharmaceutical R & D to continuously develop anti-cancer drugs having better therapeutic effects.

SUMMARY

Disclosed herein are implementations of a targeting multi-branched drug conjugate, wherein the conjugate has three or more branched chains and can be represented by the following formula:

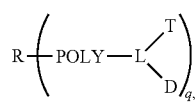
(I)

wherein R is an organic core, POLY is a polymer, L is a multivalent linker, T is a targeting molecule, D is an active agent and q is any integer between 3-8.

Organic Core, "R"

In structural formula (I), "R" is an organic core group with 1-100 atoms. Preferably, R contains 3-50 atoms, and more preferably, R contains about 3-30 atoms. R can be a core group in which all the atoms are carbon atoms, or can selectively contain one or more heteroatoms, such as O, S, N and P, depending on the special central molecule used. R can be a linear, branched or cyclic core group, and has at least 3 independent polymer branched chains. In structural formula (I), "q" is a number corresponding to the number of polymer branched chains of "R".

In some particular embodiments, "R" has three polymer branched chains and "R" is preferably

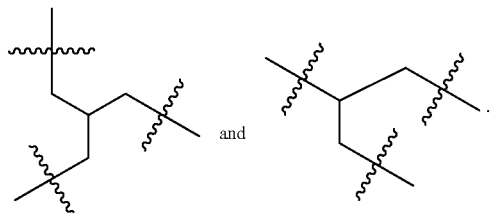 [SMILES: *CC(C*)C* ; *CC(*)C*]

In some particular embodiments, "R" has four polymer branched chains and "R" is preferably

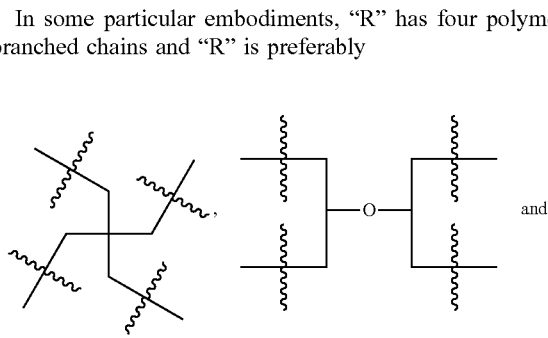

In some particular embodiments, "R" has six polymer branched chains and "R" is preferably

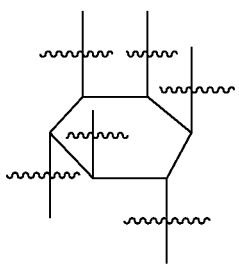

In some particular embodiments, "R" has eight polymer branched chains and "R" is preferably

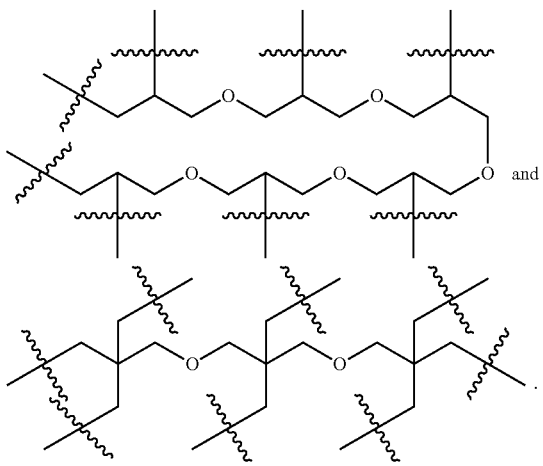

Polymer, "POLY"

In structural formula (I), "POLY" is a polymer, preferably a water-soluble polymer, and any water-soluble polymer can be used to form the conjugate of the present invention. The polymer of the present invention can be in any geometric shapes or forms. Representative polymers include but are not limited to: polyethylene glycol, polypropylene glycol, poly(vinylpyrrolidone), poly(hydroxyalkyl methacrylate amine), poly(hydroxyalkyl methacrylate), poly(saccharide), poly(α-hydroxy acid), poly(acrylic acid), poly(vinyl acetate), polyphosphazine, polyoxazoline and poly(N-acryloylmorpholine).

In a typical compound, "POLY" is polyethylene glycol, which can be in any geometric shapes or forms, including linear, branched and forked shapes or forms; preferably, a preferred "POLY" of the present invention is linear polyethylene glycol, which typically has a structure as follows:

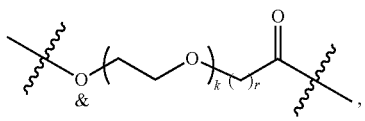

wherein " $\sim$ " represents an attachment between atoms, and the oxygen atom marked with a "&" is the atom attached to the organic core "R", and wherein k ranges from about 5-500, most preferably 50-200, preferably 101-125, and more preferably k is 113. It should be known to those skilled in the art that in the field of polymers, k represents a degree of polymerization of a polymer, that is, an average number of repeating units contained in macromolecular chains of a polymer, depending on the molecular weight of the polymer; for example, when k is 113, the average number of repeating units contained in macromolecular chains is 113. When the average number of repeating units contained in macromolecular chains of a polymer is 113, the molecular chains of the polymer may actually contain different numbers of repeating units; for example, different molecular chains of the polymer may actually contain, for example, 100-130 repeating units.

r is any integer between 1-10; more preferably, "POLY" of the present invention is

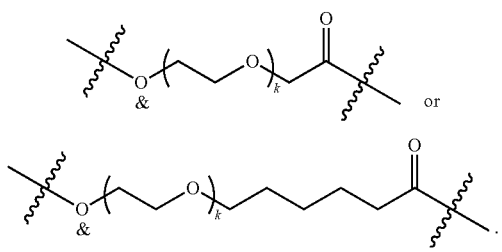

POLY of the present invention can also be:

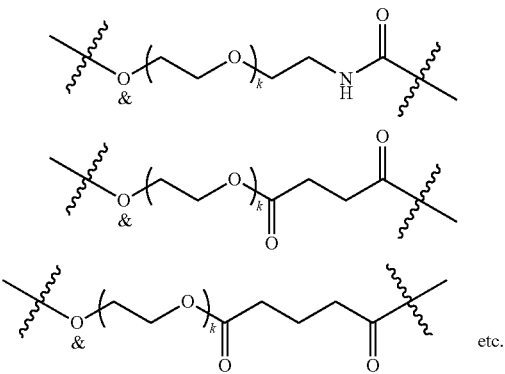

In a particular embodiment of the present invention, "R" is an organic core group with 5 carbon atoms and can be attached to four polymer branched chains, each branched chain comprising a linear polyethylene glycol connecting arm.

In the particular preparation of the multi-branched drug conjugate of structural formula (I), the required multi-arm polymer, i.e., R attaching to q polymer arms R—(POLY)$_q$, can be prepared or purchased in advance.

In a particular embodiment, the multi-arm polymer R—(POLY)$_q$ can be 3armPEG20K-SCM, 4armPEG20K-SCM or 8armPEG20K-SCM, wherein R—(POLY)$_q$ preferably has a molecular weight of about 20 kDa. The expression "about 20 kDa" indicates a molecular weight of between 20000±2000.

The 4arm-PEG20K-SCM used in examples of the present invention has a structure as follows:

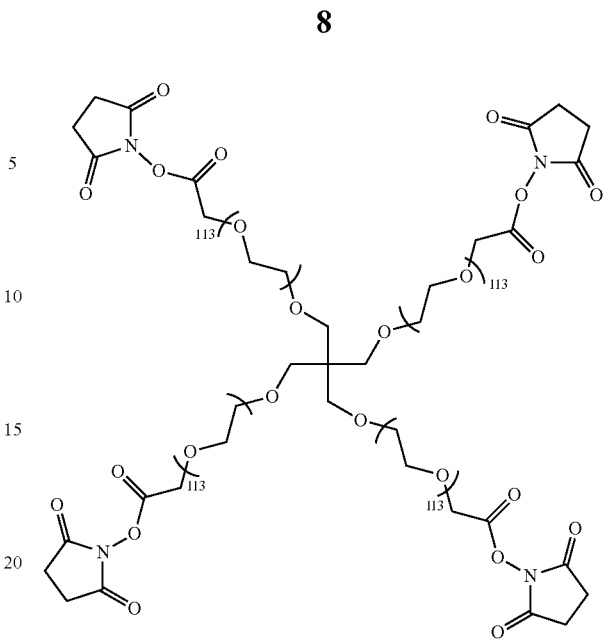

In a preferred embodiment of the present invention, "POLY" is a linear polyethylene glycol connecting arm, namely, the conjugate of the present invention is preferably a compound as follows:

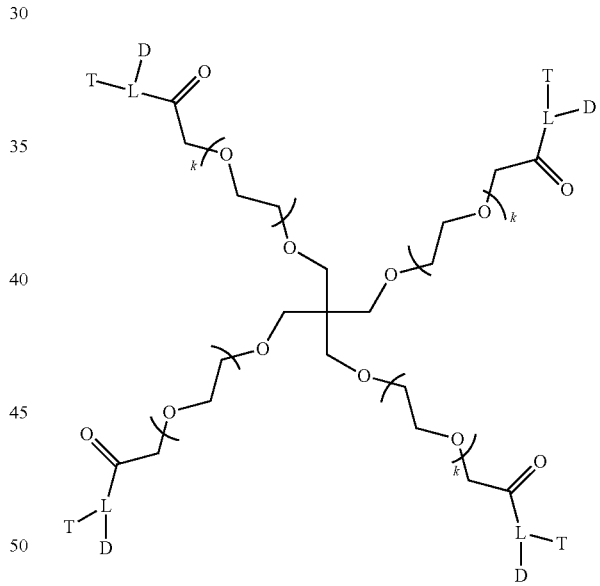

In the present invention, the multivalent linker L is preferably:

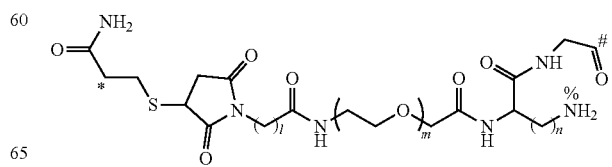

wherein the symbol represents an attachment point of the multivalent linker L to the targeting molecule T; "#" represents an attachment point of the multivalent linker L to the active agent D; and "%" represents an attachment point of the multivalent linker L to the POLY, wherein m is any integer between 1-20, and l and n are independently any integer between 1-10. Most preferably, l is 5, m is 3 and n is 4, namely, a preferred multivalent linker L of the present invention is

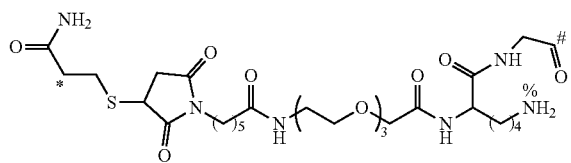

D is a camptothecin-based drug represented by the following formula:

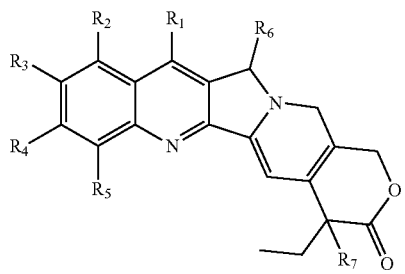

$R_1$-$R_5$ are selected from the following groups independently from each other: hydrogen, halogen, acyl, alkyl, substituted alkyl, alkoxy, substituted alkoxy, alkenyl, alkynyl, cycloalkyl, hydroxy, cyano, nitro, azido, amido, hydrazine, amine, substituted amine, hydroxycarbonyl, alkoxycarbonyl, alkoxycarbonyloxy, optionally substituted carbamoyloxy, arylsulfonyloxy, alkylsulfonyloxy and $R_9C$(O)O—, wherein $R_9$ is halogen, amino, substituted amino, heterocycle or substituted heterocycle; $R_6$ is H or $OR_8$; $R_8$ is alkyl, alkenyl, cycloalkyl, haloalkyl or hydroxyalkyl; $R_7$ is hydroxy, amino or thiol.

The heterocycle is preferably nitrogen-containing heterocycle, more preferably 5-6 membered nitrogen-containing heterocycle. With regard to the above-mentioned groups having substituents, the substituents thereof can be selected from hydroxy, cyano, C1-C5 linear or branched alkyl, C3-C7 cycloalkyl, C1-C5 linear or branched alkoxy, 5-6 membered heterocyclyl, 5-12 membered aryl or 5-12 membered heteroaryl, and preferably, the heteroatom in the 5-12 membered heteroaryl and 5-6 membered heterocyclyl is a nitrogen atom. The heterocycle may be, for example, pyrrole, piperidine, etc., and the 5-6 membered heterocyclyl can be, for example, pyrrolyl or piperidinyl; the aryl includes phenyl, naphthyl, biphenyl and analogs thereof.

In addition, with regard to the substituted carbamoyloxy, the substituent thereof together with the N atom to which it is attached can also form a 6-membered ring, and the 6-membered ring can also have the above-mentioned substituent.

Preferably, D is irinotecan or SN38.
Irinotecan has a structure as follows:

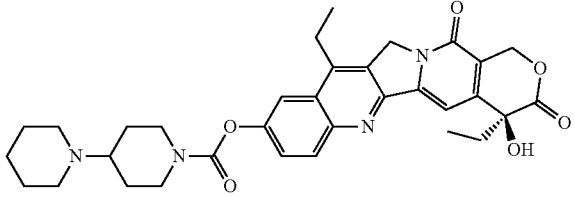 [SMILES: CCc1c2c(nc3ccc(OC(=O)N4CCC(N5CCCCC5)CC4)cc13)-c1cc3c(c(=O)n1C2)COC(=O)[C@]3(O)CC]

SN38 has a structure as follows:

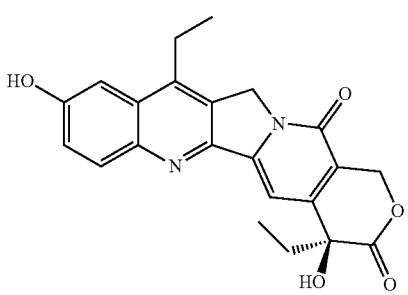 [SMILES: CCc1c2c(nc3ccc(O)cc13)-c1cc3c(c(=O)n1C2)COC(=O)[C@]3(O)CC]

T is a targeting molecule, which is a "CD44-targeted polypeptide" capable of binding to CD44. Typically, "CD44-targeted polypeptides" include polypeptides with the following sequences:

```
Ac-KPSSPPEE-NH2;

Ac-NASAPPEE-NH2;

QETWFQNGWQGKNP;

KEKWFENEWQGKNP;

KEQWFGNRWHEGYR;
and

QIRQQPRDPPTETLELEVSPDPAS.
```

The substitution variants, addition variants and chemically-modified derivative of the above-mentioned polypeptides are also included.

T may also be a polypeptide disclosed in WO 99/05263, that is, a polypeptide having the following sequences, or a substitution variant, an addition variant and a chemically-modified derivative thereof: Lys-Pro-Ser-Ser-Pro-Pro-Glu-Glu (KPSSPPEE) and Asn-Ala-Ser-Ala-Pro-Pro-Glu-Glu (NASAPPEE). In addition, T may be an FKBP-L polypeptide disclosed in WO 2007141533.

The targeting molecule T may also be a monoclonal antibody or a natural ligand thereof capable of binding to CD44. The natural ligand capable of binding to CD44 includes, but is not limited to hyaluronic acid (HA), osteopontin (OPN), serglycin, collagen, fibronectin, laminin, chondroitin sulfate C (CSC), heparan sulfate (HS), ankyrin, Galectin-3, L-selectin, P-selectin, C-type lectin and addressin.

The targeting molecule T of the present invention is preferably Ac-KPSSPPEE-NH2 or Ac-NASAPPEE-NH2—, and the two polypeptides are connected to the multivalent linker L via a terminated NH2 end.

In a particular embodiment of the present invention, the multi-branched drug conjugate of structural formula (I) includes compound A, compound B, compound C, and compound D as follows:
Compound A
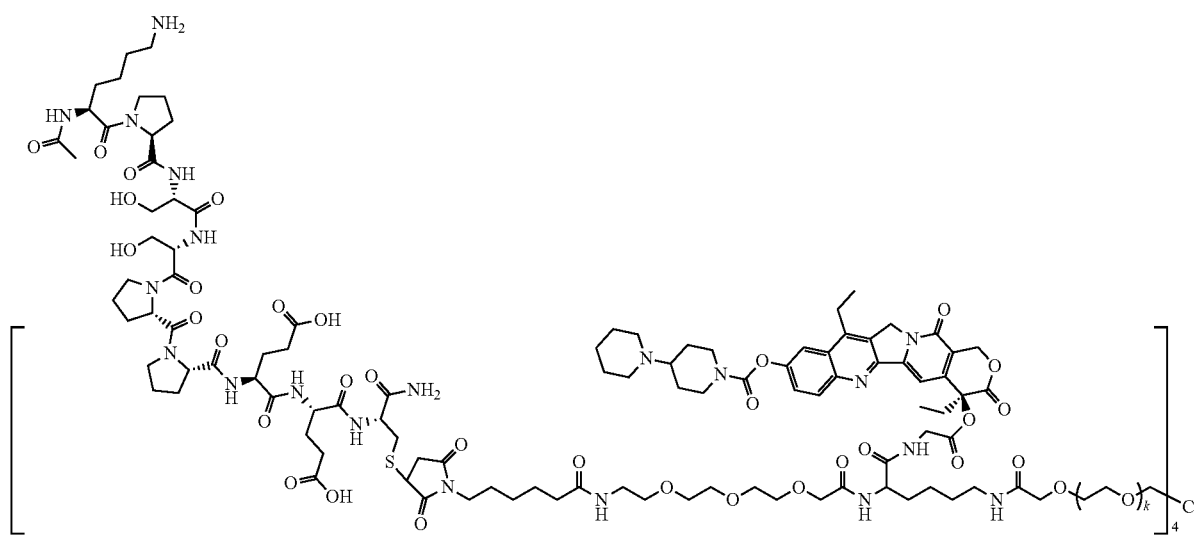
Compound B
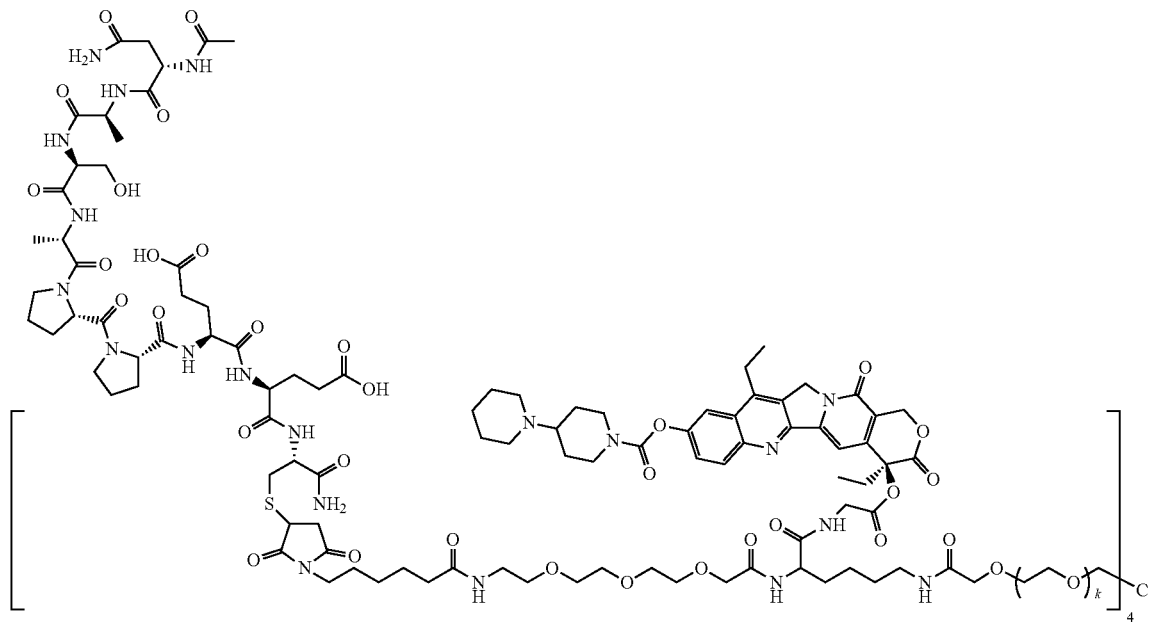

Compound C
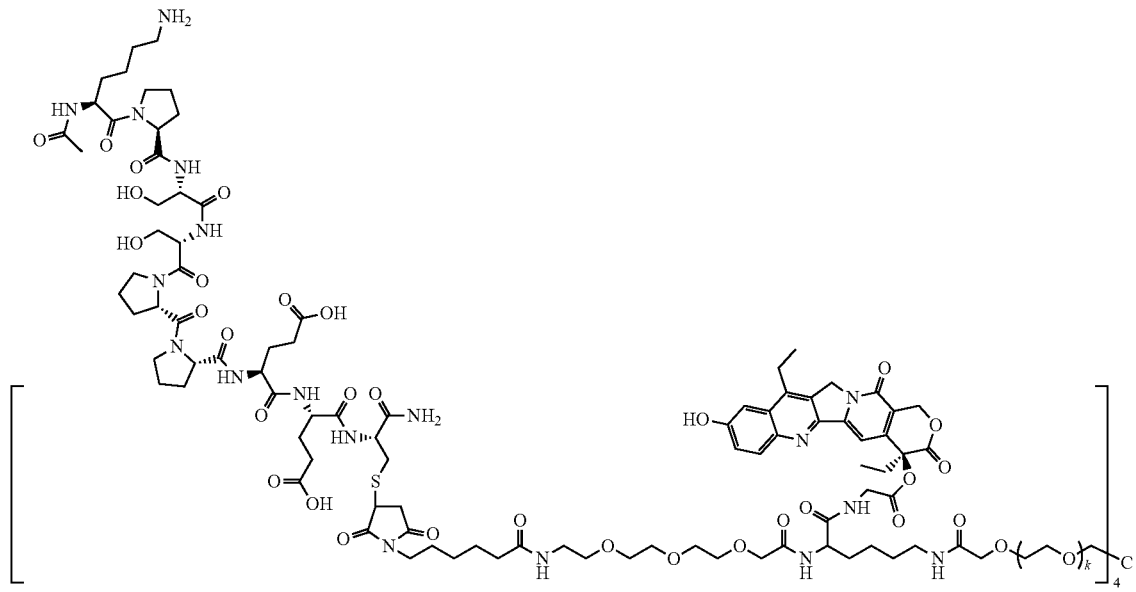
Compound D
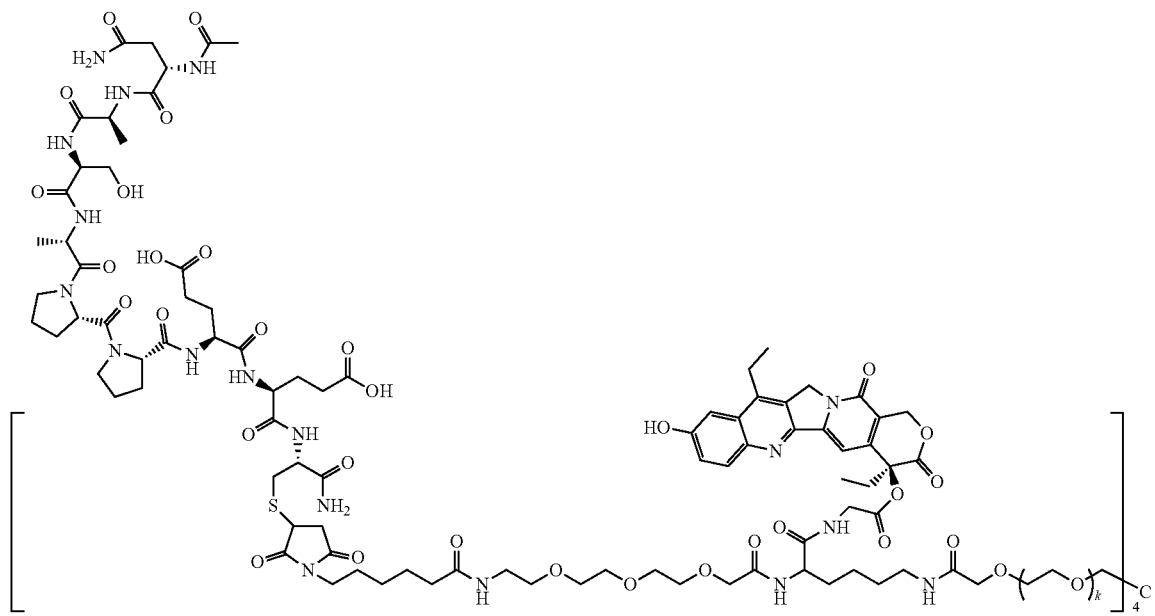
wherein each k in the molecular structures of compound A, compound B, compound C and compound D is independently 101-125, preferably each k is independently 113.

In a particular embodiment of the present invention, the multi-branched drug conjugate of structural formula (I) is
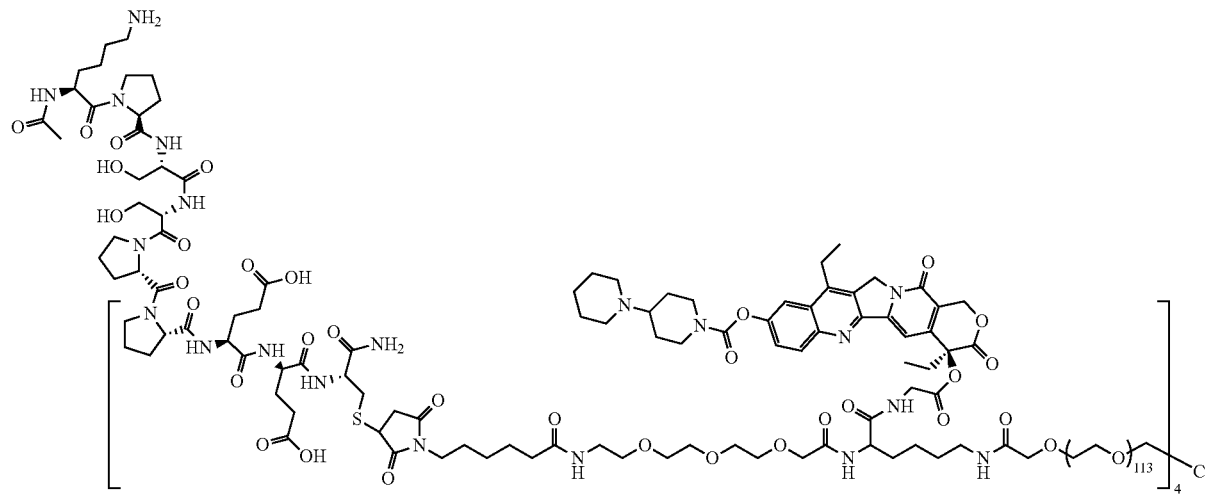
Compound a
in compound a, D is irinotecan, and T is A6, i.e., Ac-KPSSPPEE-NH2,
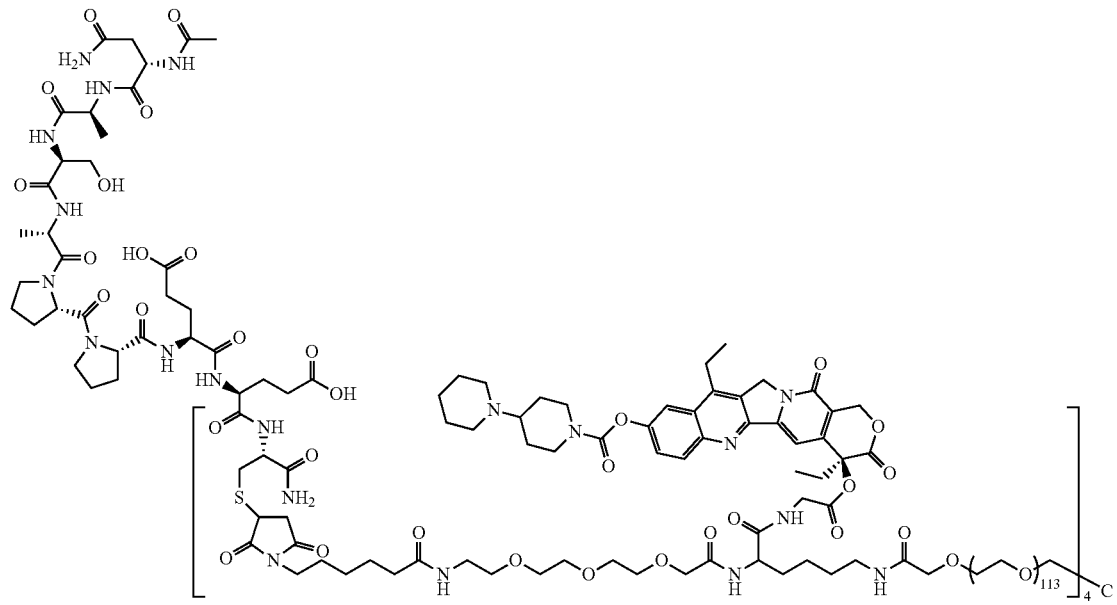
Compound b in compound b, D is irinotecan, and T is Ac-NASAPPEE-NH2, connecting the active agent D to the multivalent linker L to obtain a D-L part;

Compound c

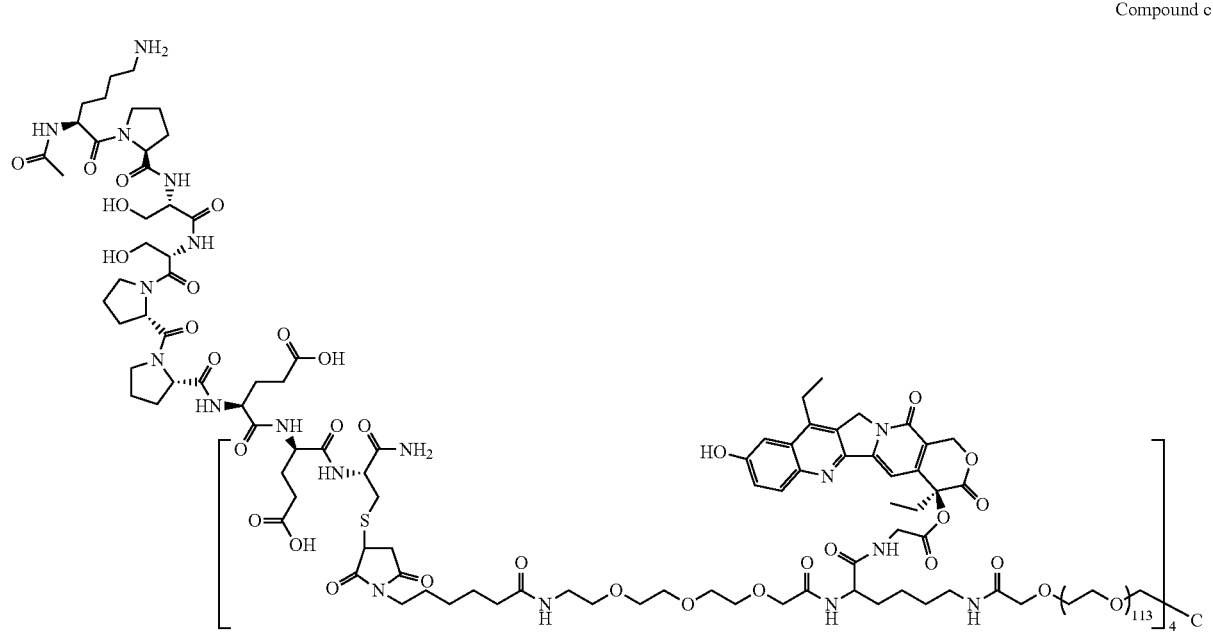

in compound c, D is SN38, and T is A6, i.e., Ac-KPSSPPEE-NH$_2$;

connecting the D-L part to the multi-arm polymer R$-$(POLY)$_q$ to obtain R$-$(POLY-L-D)$_q$; and Compound d

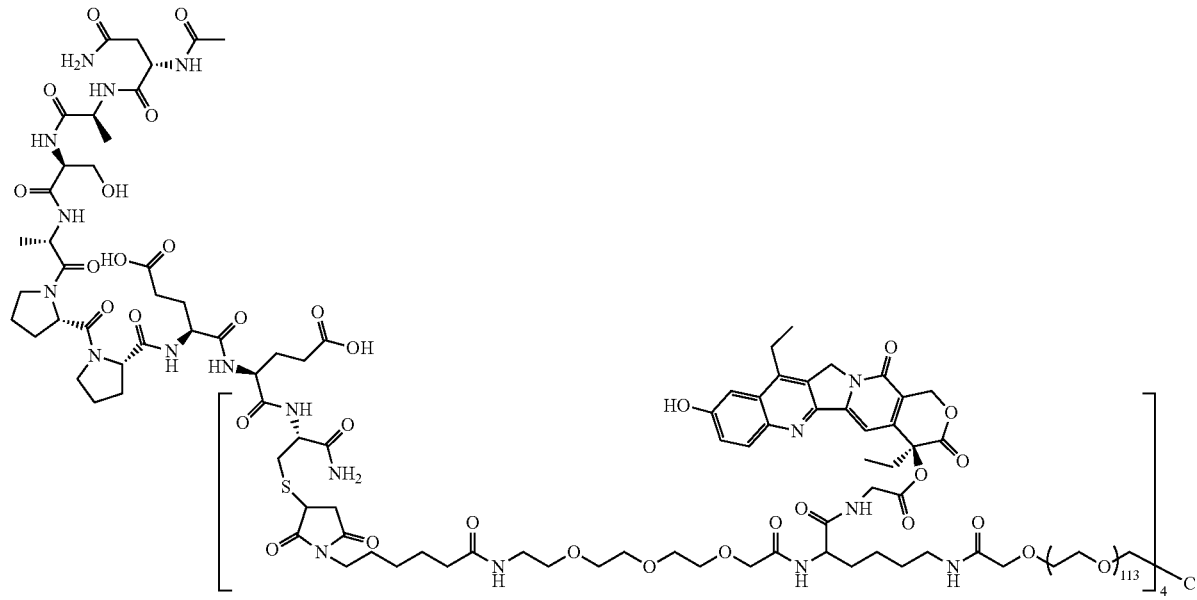

in compound d, D is SN38, and T is Ac-NASAPPEE-NH$_2$.

In an embodiment of the present invention, the method for preparing the multi-branched drug conjugate of structural formula (I) or a pharmaceutically acceptable salt thereof comprises connecting R$-$(POLY-L-D)$_q$ to the targeting molecule T.

The present invention relates to a targeting anti-cancer conjugate modified with a multi-arm polymer, wherein the modification with a water-soluble polymer can enhance a water solubility of the conjugate, thereby increasing a drug loading; and a targeting molecule improves a targeting capability, so that the concentration of the conjugate in a target tissue is high; L is any connection linker which has a function of first connecting a targeting molecule to an anticancer drug and then connecting the targeting molecule and the anticancer drug to a polymer arm, so that the entire conjugate forms an organic whole. The conjugate of the present invention is typically a prodrug, and the active agent D is released and separated from the parent through hydrolysis or enzymolysis, exerting a physiological activity. Compared with an unconjugated drug, the conjugate of the present invention shows a stronger effect and is more enriched in the body of human or other animals.

The pharmaceutically acceptable salt of the conjugate of the present invention include inorganic salts and organic salts, and typically include nitrate, sulfate, phosphate, hydrofluoride, hydrochloride, hydrobromide, hydroiodide, formate, lactate, benzoate, acetate, trifluoroacetate, dichloroacetate, trichloroacetate, mixed chlorofluoroacetate, citrate, oxalate, sulfonate, mesylate, trifluoromesylate, heptanesulfonate, etc., preferably hydrochloride and acetate, wherein the salts can be prepared by a conventional means in the field of medicinal chemistry.

In a particular embodiment of the present invention, the salts of compound A, compound B, compound C and compound D typically include hydrochloride and acetate, wherein the hydrochloride is typically a hydrochloride in which each branched chain is respectively bonded to one or two molecules of hydrochloric acid, and the acetate is typically an acetate in which each branched chain is respectively bonded to one or two molecules of acetic acid.

The hydrochloride of compound a, compound b, compound c and compound d is typically a hydrochloride in which each branched chain is respectively bonded to one or two molecules of hydrochloric acid, and the conjugate is preferably a hydrochloride containing four or eight molecules.

The acetate of compound a, compound b, compound c and compound d is typically an acetate in which each branched chain is respectively bonded to one or two molecules of acetic acid, and the conjugate is preferably an acetate containing four or eight molecules.

The compound of the present invention is capable of specifically binding to CD44, and may target tumor cells and tissues having high expression of CD44, so that the concentration of the conjugate in a target tissue is high, the clinical treatment effect thereof is improved, and toxicity is reduced.

The compound of the present invention is suitable for treating all tumors having high expression of CD44, comprising but not limited to gastric cancer, pancreatic cancer, small cell lung cancer, colon cancer, breast cancer, lung adenocarcinoma, liver cancer, nasopharyngeal carcinoma, malignant glioma, lymphoma, renal carcinoma, ovarian cancer, head and neck cancer, squamous cell carcinoma, and the like.

The present invention also provides a method for treating tumors having high expression of CD44, which comprises administering a therapeutically effective amount of the multi-branched drug conjugate of structural formula (I) or a pharmaceutically acceptable salt thereof provided by the present invention to a mammal suffered from a tumor having high expression of CD44, wherein the mammal includes human.

The present invention also provides a method for treating tumors having high expression of CD44, which comprises administering a therapeutically effective amount of the pharmaceutical composition to a mammal suffered from a tumor having high expression of CD44, wherein the mammal includes human, and the pharmaceutical composition comprises the multi-branched drug conjugate of structural formula (I) or a pharmaceutically acceptable salt thereof and a pharmaceutically acceptable excipient.

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure will be described in detail. However, it is to be understood that that what is disclosed may be specifically embodied in many different forms and should not be limited to the examples described herein, and these examples are provided so that the disclosure will be more complete and thorough. The reagents and raw materials used are commercially available, except for those whose preparation methods are provided. 4armPEG20K-SCM is purchased from Beijing Jenkem Technology Co., Ltd. and has a molecular weight of about 20 kDa. Unless otherwise defined, all scientific and technical terms herein have the same meanings as those commonly understood by those skilled in the art to which the subject matter of the claims pertains.

In certain embodiments, 4arm-PEG20K-SCM has a structure as follows:

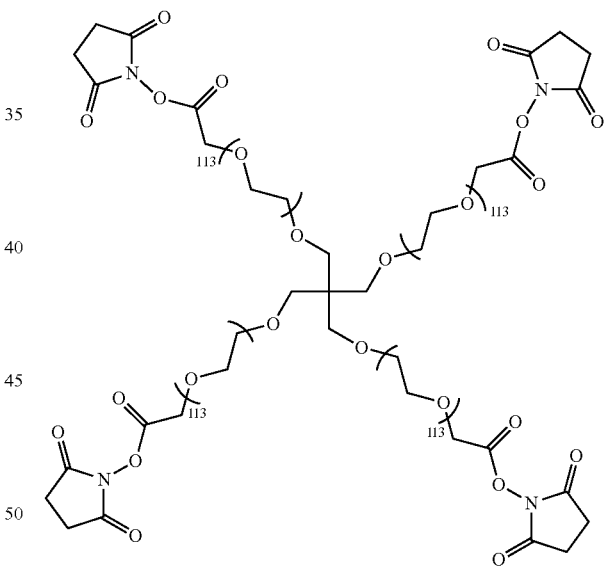

Terms

| Abbreviations | Terms |
| --- | --- |
| DMF | N,N-dimethylformamide |
| DCM | Dichloromethane |
| DMSO | Dimethyl sulfoxide |
| DMAP | 4-dimethylaminopyridine |
| DCC | Dicyclohexylcarbodiimide |
| IPA | Isopropyl alcohol |
| EA | Ethyl acetate |
| DEPC | Diethyl cyanophosphate |

| Abbreviations | Terms |
|---|---|
| PBS | Phosphate buffer |
| DIC | N,N-diisopropylcarbodiimide |
| TFA | Trifluoroacetic acid |
| TBME | Methyl tert-butyl ether |
| HOSU | N-hydroxysuccinimide |
| DME | 1,2-Dimethoxyethane |
| HOBT | 1-hydroxybenzotriazole |
| THF | Tetrahydrofuran |
| DIEA | N,N-diisopropylethylamine |
| TEA | Triethylamine |
| EDC•HCl | 1-ethyl-(3-dimethylaminopropyl)carbodiimide hydrochloride |
| TIS | Triisopropylsilane |

Example I

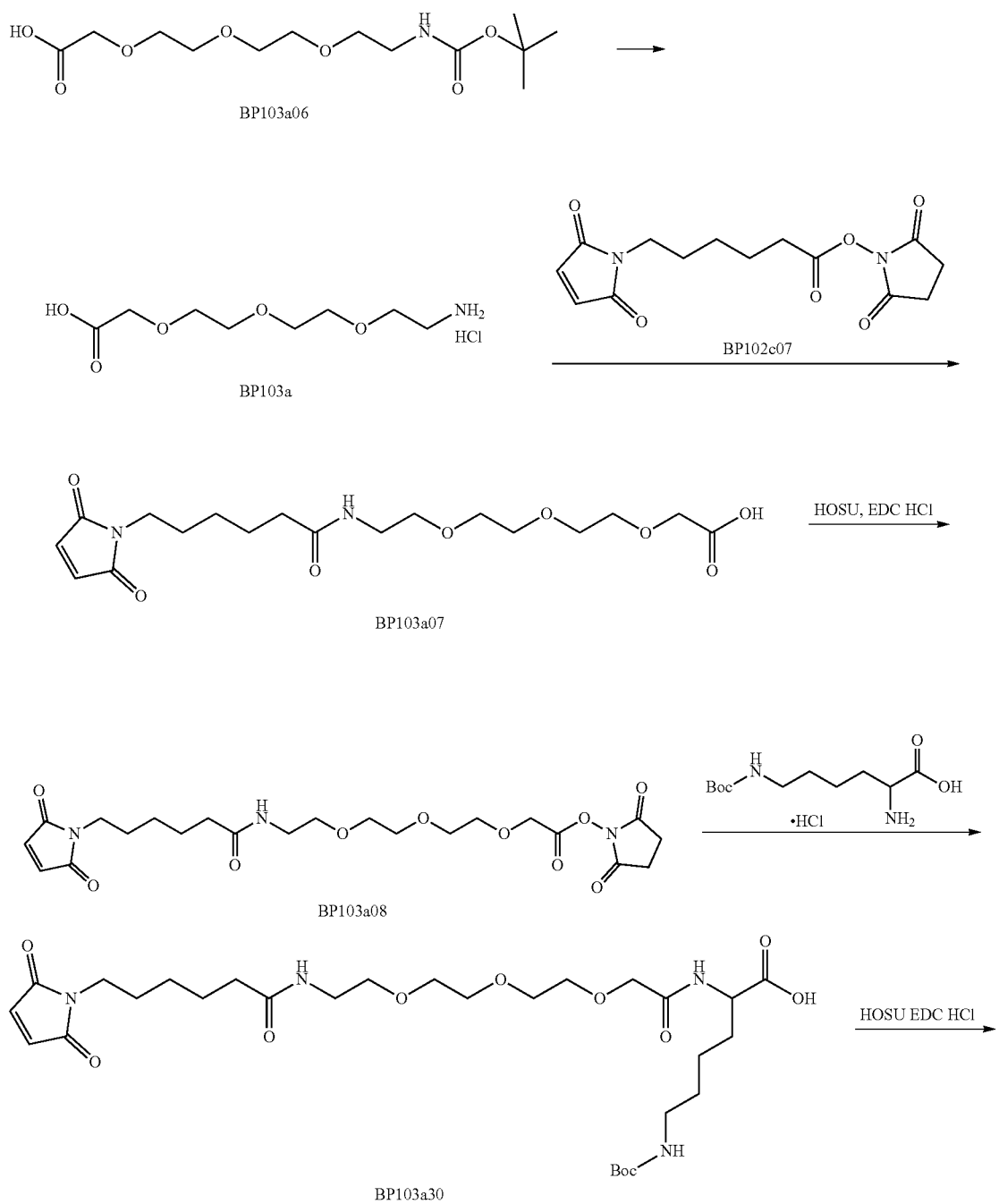

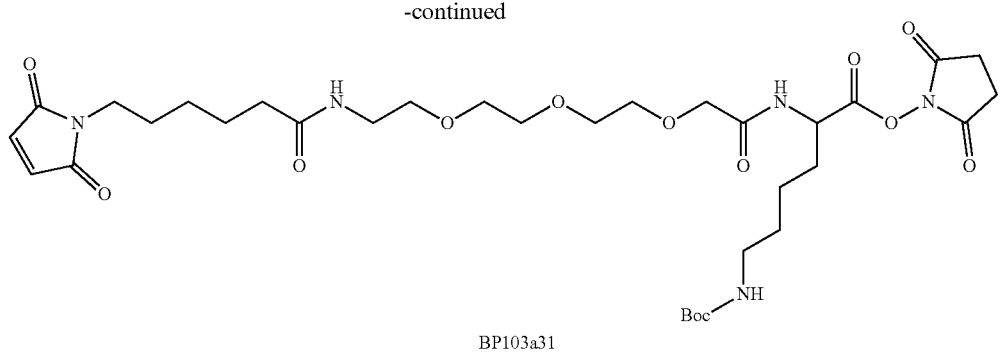

BP103a31

1. Preparation of BP103a

To a 250 ml three-necked flask, 18.20 g of compound BP103a05 and 100 ml of EA were added; the compound was dissolved with stirring and the mixture was then cooled to 0° C.; 150 ml of HCl/EA (3.5 M) was added and the temperature was maintained at 0° C.; after TLC detected that the reaction was completed, the reaction solution was concentrated to dryness, slurried by adding methyl tert-butyl ether and filtered; and the filter cake was washed with TBME and dried in vacuo to obtain 10.40 g of BP103a as a white solid.

2. Preparation of BP103a07

To a 100 mL flask, 3.00 g of BP103a (1.0 eq), 4.02 g (1.0 eq) of BP102c07, 40 ml of DCM and 4.0 ml of DIEA (2.0 eq) were added, and the mixture was stirred at room temperature; after TLC detected that the reaction was completed, the organic solvent was removed by evaporation; and the residue was subject to column chromatography to obtain 6.4 g of BP as an oil.

3. Preparation of BP103a08

To a 200 ml three-necked flask, 9.00 g of BP103a07 (1.0 eq), 3.96 g of HOSU (1.53 eq), 90 ml of DCM and 6.60 g of EDC HCl (1.53 eq) were added and reacted at room temperature for 2 h; and after TLC detected that the reaction was completed, the mixture was diluted with DCM and then washed twice with 50 mmol/L of potassium dihydrogen phosphate aqueous solution, washed with saturated brine, dried over anhydrous sodium sulfate and concentrated to obtain 5.93 g of BP103a08 as a colorless oil.

4. Preparation of BP103a30

To a 200 mL flask, 2.93 g of compound NH2-Lys (Boc)-OH HCl (1.0 eq), 60 ml of water and 2.00 g of NaHCO$_3$ (2.0 eq) were added; a solution of 5.91 g of BP103a08 (1.0 eq) in 60 ml of DME was added dropwise with stirring; 60 ml of THF was supplemented; the mixture was stirred overnight; after TLC detected that the reaction was completed, the organic solvent was removed by evaporation; and the residue was adjusted to pH≈3 with dilute hydrochloric acid, extracted with EA, dried over anhydrous sodium sulfate and concentrated to obtain 4.50 g of BP103a30 as a colorless oil.

5. Preparation of BP103a31

To a 100 ml three-necked flask, 5.00 g of BP103a30 (1.0 eq), 1.40 g of HOSU (1.53 eq), 50 ml of DCM and 2.33 g of EDC HCl (1.53 eq) were added and reacted at room temperature for 2 h; and after TLC detected that the reaction was completed, the mixture was diluted with DCM and then washed twice with 50 mmol/L of potassium dihydrogen phosphate aqueous solution, washed with saturated brine, dried over anhydrous sodium sulfate and concentrated to obtain 4.89 g of BP103a31 as a colorless oil.

Example II

Synthesis of Intermediate Ac-KPSSPPEEC-NH$_2$

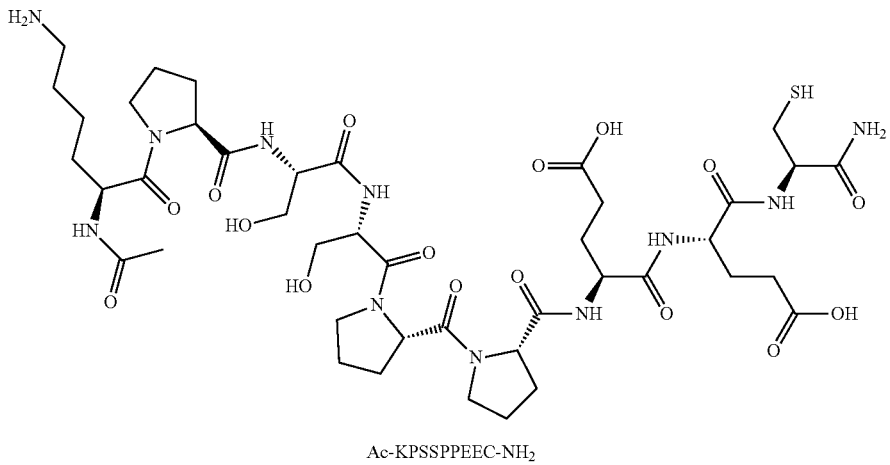 [SMILES: CC(=O)N[C@@H](CCCCN)C(=O)N1CCC[C@H]1C(=O)N[C@@H](CO)C(=O)N[C@@H](CO)C(=O)N1CCC[C@H]1C(=O)N1CCC[C@H]1C(=O)N[C@@H](CCC(=O)O)C(=O)N[C@@H](CCC(=O)O)C(=O)N[C@@H](CS)C(N)=O]

Ac-KPSSPPEEC-NH$_2$

Ac-KPSSPPEEC-NH$_2$ was synthesized by means of an Fmoc solid-phase synthesis method well known to those skilled in the art; Fmoc was removed by using Rink-amide Resin and 20% of piperidine/DMF; HOBT/DIC was used as a coupling reagent, and DMF was used as a reaction solvent; the reaction was monitored by a ninhydrin detection method; the following protected amino acids were sequentially coupled to the resin: Fmoc-Cys(Trt)-OH, Fmoc-Glu(OtBu)-OH, Fmoc-Glu(OtBu)-OH, Fmoc-Pro-OH, Fmoc-Pro-OH, Fmoc-Ser(tBu)-OH, Fmoc-Ser(tBu)-OH, Fmoc-Pro-OH and Fmoc-Lys(Boc)-OH; the resultant was acetylated with acetic anhydride and pyridine, then washed with DMF, methanol and DCM, and dried; a lysis reagent (TFA:thioanisole:phenol:TIS=85:5:5:5) was added; after reacting for 2 hours, the mixture was precipitated using ice-cooled TBME and centrifuged to obtain crude Ac-KPSSPPEEC-NH$_2$, which was purified by prep-HPLC and then lyophilized to obtain a pure product.

Example III

Synthesis of Intermediate Ac-NASAPPEEC-NH$_2$

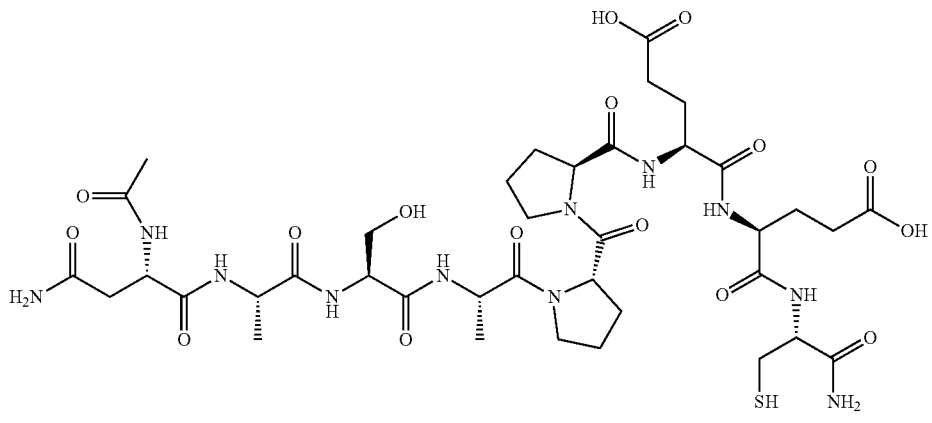

Ac-NASAPPEEC-NH$_2$

Ac-NASAPPEEC-NH$_2$ was synthesized by means of an Fmoc solid-phase synthesis method well known to those skilled in the art; Fmoc was removed by using Rink-amide Resin and 20% of piperidine/DMF; HOBT/DIC was used as a coupling reagent, and DMF was used as a reaction solvent; the reaction was monitored by a ninhydrin detection method; the following protected amino acids were sequentially coupled to the resin: Fmoc-Cys(Trt)-OH, Fmoc-Glu(OtBu)-OH, Fmoc-Glu(OtBu)-OH, Fmoc-Pro-OH, Fmoc-Pro-OH, Fmoc-Ala-OH, Fmoc-Ser(tBu)-OH, Fmoc-Ala-OH and Fmoc-Asn(Trt)-OH; the resultant was acetylated with acetic anhydride and pyridine, then washed with DMF, methanol and DCM, and dried; a lysis reagent (TFA:thioanisole:phenol:TIS=85:5:5:5) was added; after reacting for 2 hours, the mixture was precipitated using ice-cooled TBME and centrifuged to obtain crude Ac-NASAPPEEC-NH$_2$, which was purified by prep-HPLC and then lyophilized to obtain a pure product.

Example IV

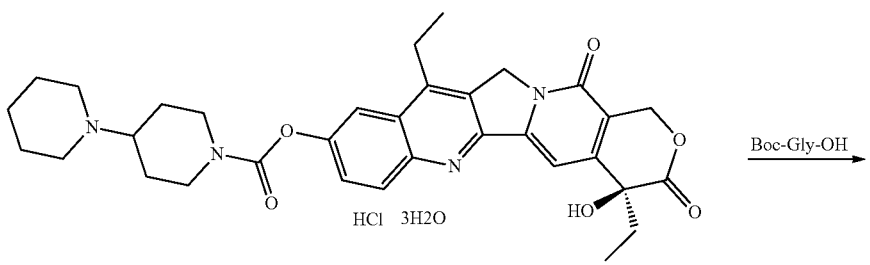

-continued
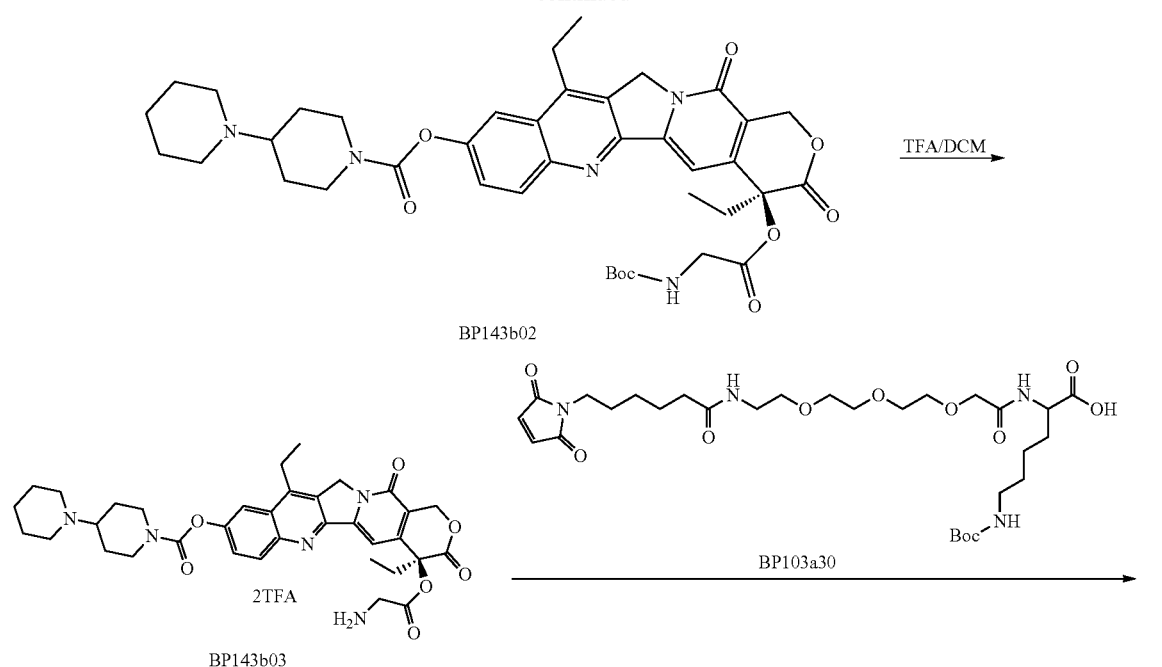
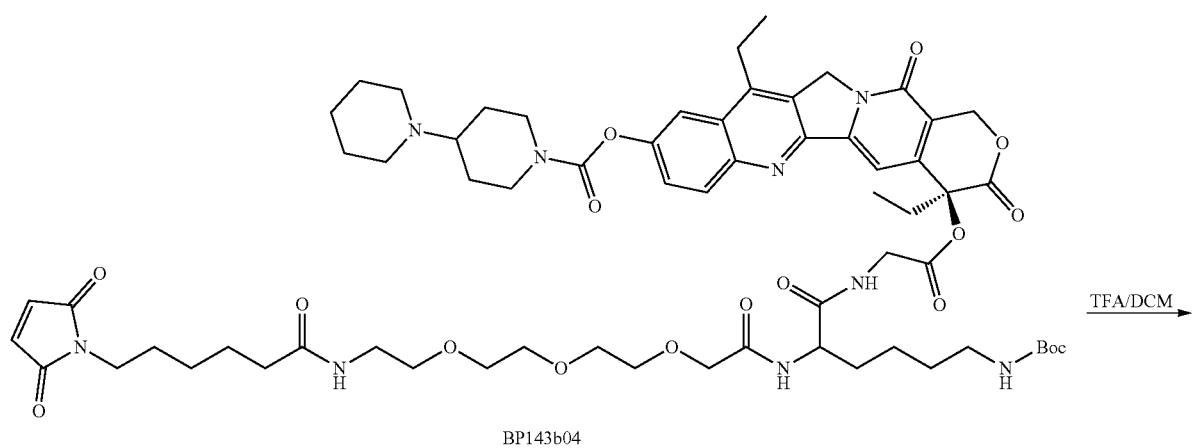
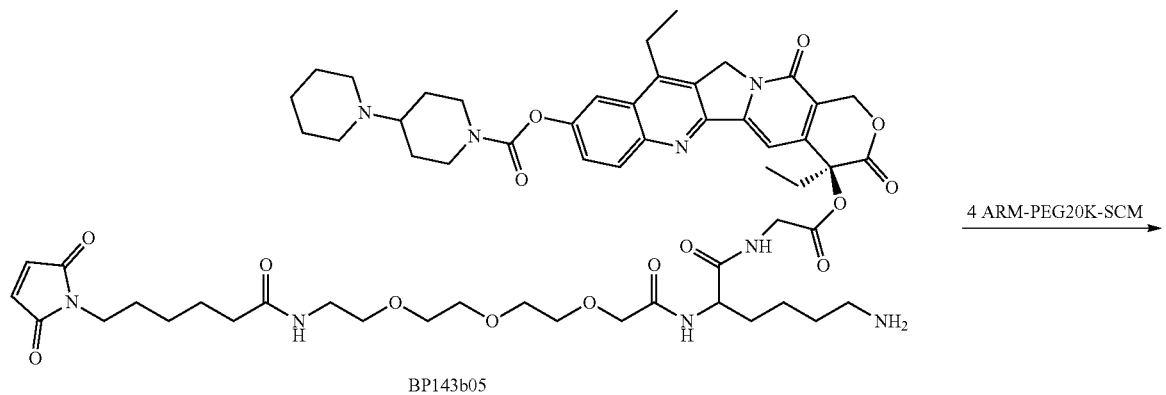

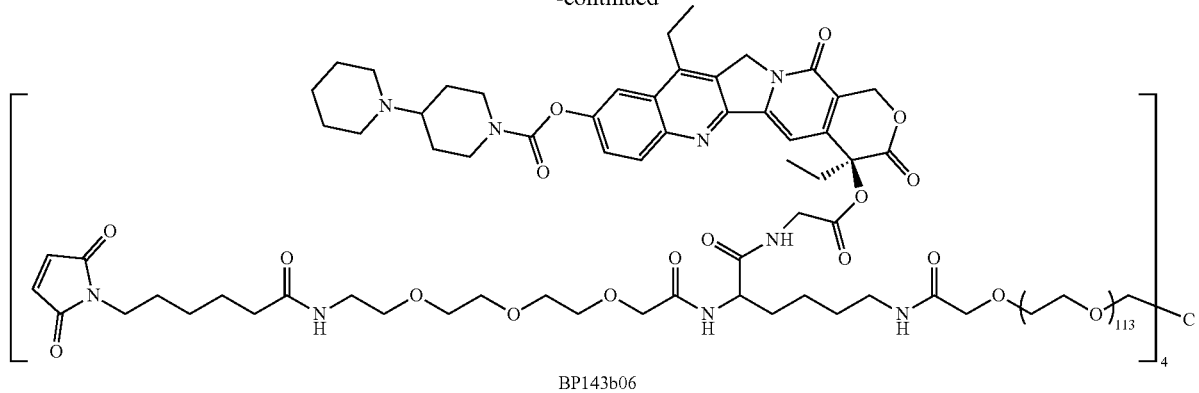

BP143b06

1. Preparation of BP143b02

To a 250 mL round bottom flask, 3.50 g of irinotecan hydrochloride trihydrate (1.0 eq) and 52.5 ml of DMF were added and heated to 60° C. to dissolve same; after 5-10 min, DMF was removed by evaporation under reduced pressure; 300 ml of n-heptane was added, and the mixture was distilled under reduced pressure for three times and subjected to rotary evaporation; 105 ml of DCM, 1.08 g of Boc-Gly-OH (1.2 eq) and 63 mg of DMAP (0.1 eq) were then added; a solution of 1.59 g of DCC (1.5 eq) in 10 ml of DCM was added dropwise, and the mixture was reacted at 20° C. for 4 hours; after TLC detected that the reaction was completed, the mixture was filtered and concentrated to 25% of the original volume, and 120 ml of IPA was added; 75% of the solvent was removed by evaporation; and 150 ml of n-heptane was added, and the mixture was stirred for 1 hour at room temperature, filtered, washed twice with n-heptane, and dried to obtain 4.02 g of BP143b02 as a light yellow solid.

2. Preparation of BP143b03

To a 100 ml three-necked flask, 4.02 g of BP143b02 and 50 ml of DCM were added, and the compound was dissolved with stirring; 11.6 ml of TFA was then added dropwise, and the mixture was reacted for 2 h at room temperature; after TLC detected that the reaction was completed, 150 ml of acetonitrile was added; 120 ml of the solvent was distilled off under reduced pressure, and the residue was poured into 320 ml of TBME solution; the mixture was stirred for 30 min and filtered; and the filter cake was washed with TBME to obtain 4.00 g of BP143b03 as a light yellow solid.

3. Preparation of BP143b04

To a 200 ml three-necked flask, 3.69 g of BP143b03, 100 ml of DCM, 3.21 g (1.05 eq) of BP103a30, 2.7 ml of DIEA (3.0 eq) and 1.2 ml of DEPC (1.5 eq) were added and reacted at room temperature for 1 h; after TLC detected that the reaction was completed, the mixture was diluted with DCM, then washed twice with water and washed once with saturated brine, dried, concentrated, purified by HPLC and then lyophilized to obtain 1.85 g of BP143b04 as a light yellow solid.

4. Preparation of BP143b05

To a 50 mL round bottom flask, 1.20 g of BP143b04 and 10 ml of 10% TFA/DCM were added and reacted at room temperature; after TLC detected that the reaction was completed, the resultant was poured into TBME, and the mixture was centrifuged and dried to obtain 210 mg of compound BP143b05 as a light yellow solid.

5. Preparation of BP143b06

To a 10 mL round bottom flask, 51 mg of BP143b05 (4.0 eq), 2 ml of DCM, 11 ul of TEA (8.0 eq) and 201 mg of 4armPEG20K-SCM (1.0 eq) were added, reacted at room temperature overnight and concentrated; the resultant was added to TBME, and the mixture was centrifuged, purified by prep-HPLC and lyophilized to obtain 85 mg of compound BP143b06 as a yellowish green solid.

Example V

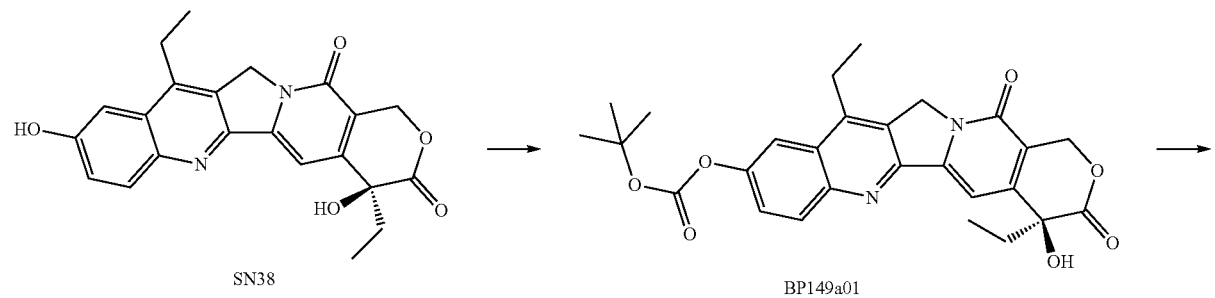

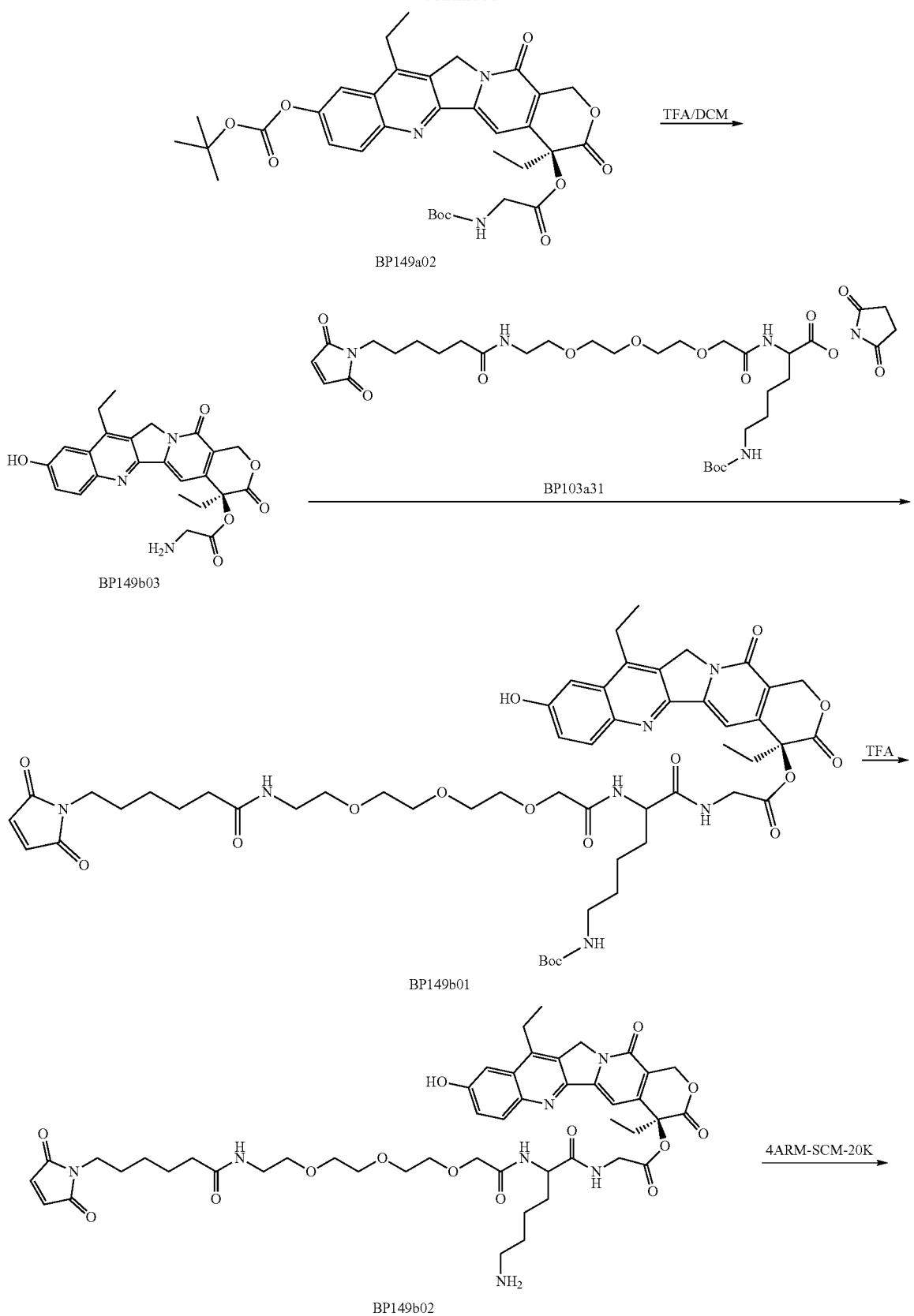

-continued

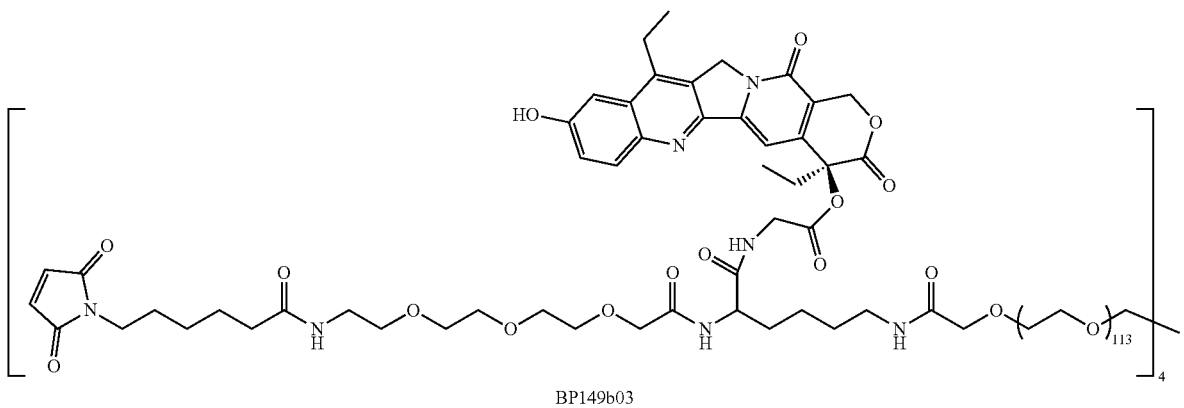

BP149b03

1. Preparation of BP149a01

To a 100 ml three-necked flask, 10.00 g of compound SN38 (1.0 eq) and 110 ml of DMSO were added; after the compound was dissolved to yield a clear solution, 5.56 g of $(Boc)_2O$ (1.0 eq) and 9.82 g of DIEA (3.0 eq) were added, and the mixture was reacted for 2 hours; after TLC detected that the reaction was completed, the reaction solution was poured into purified water, and the mixture was extracted 3 times with ethyl acetate; the organic phases were combined, washed with purified water and saturated brine and dried over anhydrous sodium sulfate to obtain an off-white solid, which was slurried by adding methyl tert-butyl ether, filtered and dried to obtain 7.95 g of compound BP149a01 as an off-white solid.

2. Preparation of BP149a02

To a 250 mL round bottom flask, 7.95 g of compound BP149a01 (1.0 eq), 2.83 g of Boc-Gly-OH (1.0 eq), 80 ml of dichloromethane and 390 mg of DMAP (0.2 eq) were added; a solution of 5.00 g of DCC (1.5 eq) in 20 ml of DCM was added dropwise, and the mixture was reacted for 1 hour at room temperature; after TLC detected that the reaction was completed, the mixture was filtered and concentrated until all of the liquid had evaporated; 30 ml of IPA was added and dissolved to yield a clear solution, and then 200 ml of n-heptane was added; and the mixture was stirred and slurried for 30 minutes, filtered, washed twice with n-heptane and dried to obtain 8.73 g of compound BP149a02 as a light yellow solid.

3. Preparation of BP149a03

To a 100 ml three-necked flask, 8.73 g of compound BP149a02 and 40 ml of DCM were added; the compound was dissolved with stirring, and the mixture was then cooled to 0° C.; 40 ml of TFA was added dropwise, and the mixture was reacted at room temperature for 2 h; after TLC detected that the reaction was completed, the reaction solution was poured into 800 ml of TBME solution, and the mixture was stirred for 30 min and filtered; and the filter cake was washed with TBME and dried in vacuo to obtain 4.95 g of BP149a03 as a light yellow solid.

4. Preparation of BP149b01

To a 200 ml three-necked flask, 2.3 g of compound BP149a03, 45 ml of DCM, 3.196 g of compound BP103a31 (1.05 eq) and 1.75 ml of TEA (3.0 eq) were added and reacted at room temperature for 4 h; after TLC detected that the reaction was completed, the mixture was diluted with DCM, washed once with dilute hydrochloric acid, washed twice with water, washed once with saturated brine, dried over anhydrous sodium sulfate and concentrated to obtain a crude product, which was purified by prep-HPLC, extracted with DCM, dried over anhydrous sodium sulfate, concentrated and dried to obtain 2.20 g of BP149b01 as a light yellow solid.

5. Preparation of BP149b02

To a 200 ml three-necked flask, 2.0 g of compound BP149b01 and 40 ml of 10% TFA/DCM were added and reacted at room temperature; after TLC detected that the reaction was completed, the resultant was poured into TBME, and the mixture was centrifuged and dried to obtain 1.75 g of BP149b02 as a light yellow solid.

6. Preparation of BP149b03

To a 200 ml three-necked flask, 4.08 g of compound BP149b02 (5.0 eq), 100 ml of DMF, 1.96 g of DIEA (20 eq) and 16.05 g of 4armPEG20K-SCM (1.0 eq) were added and reacted at room temperature for 2 hours, and the resultant was poured into 1 L of methyl tert-butyl ether; the mixture was stirred for 30 minutes and then filtered and dried to obtain 20.50 g of crude product as an off-white solid, which was purified by prep-HPLC and lyophilized to obtain 12.36 g of pure BP149b03.

Example VI

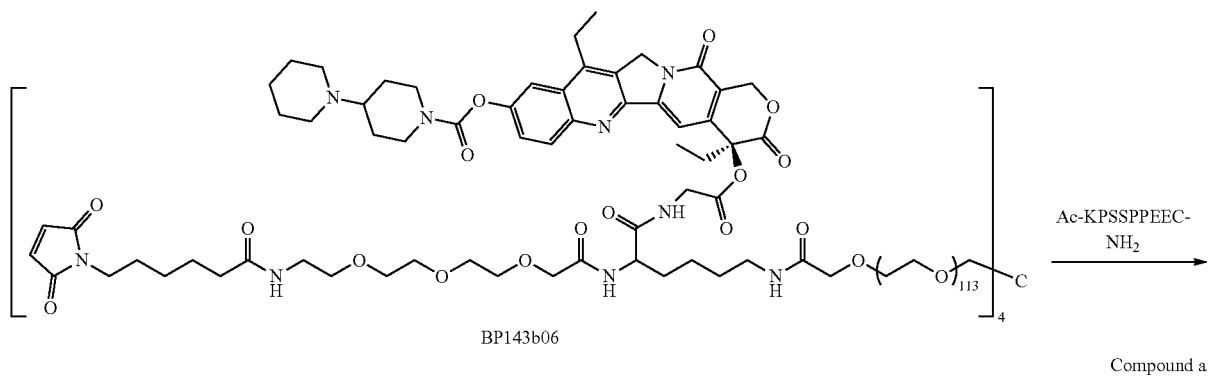

At room temperature, to a 100 ml three-neck reaction flask, 2.00 g (1.0 eq) of BP143b06 and 35 ml of PBS solution at pH=7.0 were added and dissolved with stirring to yield a clear solution; 0.45 g (5.0 eq) of targeting polypeptide 1 (Ac-KPSSPPEEC-$NH_2$) was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.65 g of pure compound a, which has a molecular weight of 28810.73, detected by MALDI-TOF.

Example VII

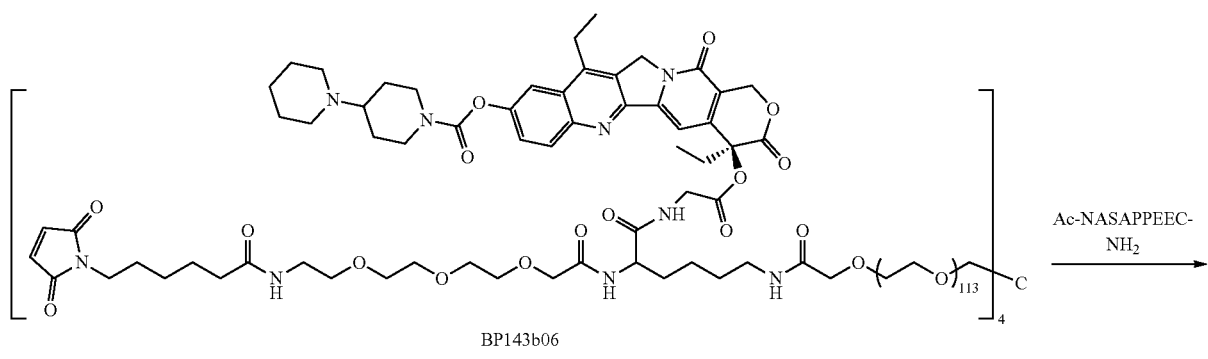

At room temperature, to a 100 ml three-neck reaction flask, 2.00 g (1.0 eq) of BP143b06 and 35 ml of PBS solution at pH=7.0 were added and dissolved with stirring to yield a clear solution; 0.38 g (5.0 eq) of targeting polypeptide 2 (Ac-NASAPPEEC-$NH_2$) was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.42 g of pure compound b, which has a molecular weight of 28931.52, detected by MALDI-TOF.

Example VIII

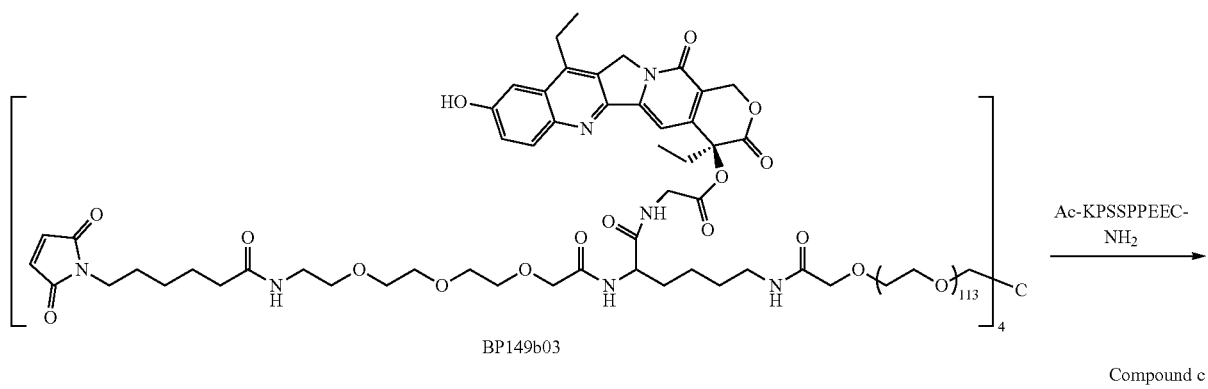

BP149b03 → Ac-KPSSPPEEC-NH₂ → Compound c

At room temperature, to a 100 ml three-neck reaction flask, 2.00 g (1.0 eq) of BP149b03 and 35 ml of PBS solution at pH=7.0 were added and dissolved with stirring to yield a clear solution; 0.46 g (5.0 eq) of targeting polypeptide 1 (Ac-KPSSPPEEC-NH$_2$) was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.45 g of pure compound c, which has a molecular weight of 28191.63, detected by MALDI-TOF.

Example IX

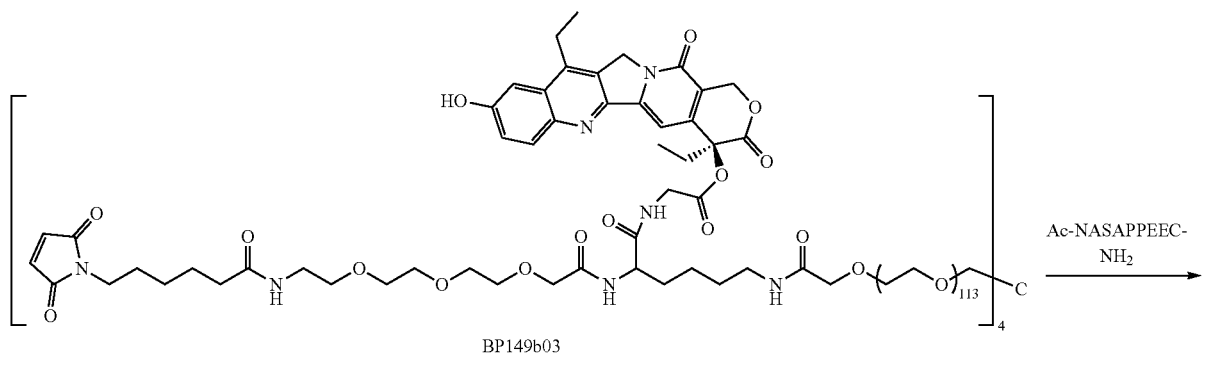

BP149b03 → Ac-NASAPPEEC-NH₂ → Compound d

At room temperature, to a 100 ml three-neck reaction flask, 2.00 g (1.0 eq) of BP149b03 and 35 ml of PBS solution at pH=7.0 were added and dissolved with stirring to yield a clear solution; 0.39 g (5.0 eq) of targeting polypeptide 2 (Ac-NASAPPEEC-NH$_2$) was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.53 g of pure compound d, which has a molecular weight of 27982.32, detected by MALDI-TOF.

Example X

Synthesis of Biotin-Labeled Targeting Polypeptide 3

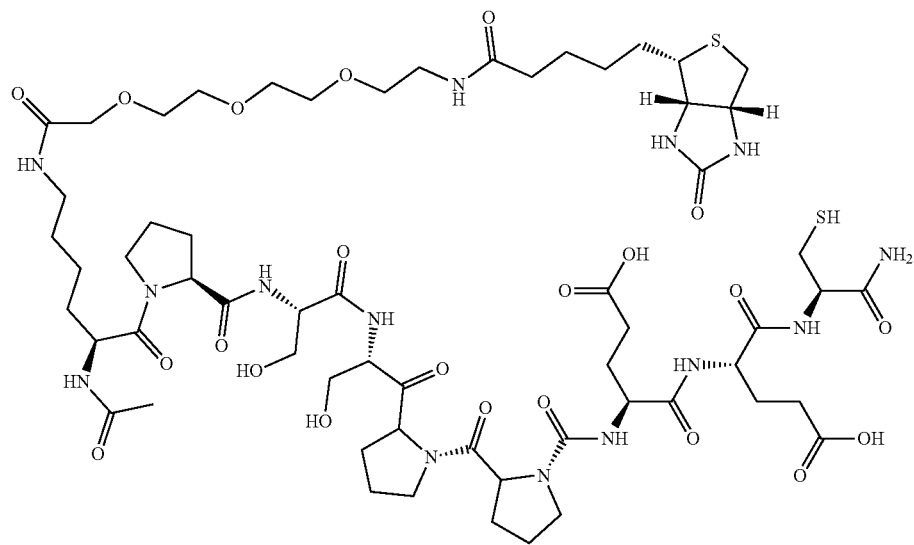

Biotin-labeled targeting polypeptide 3 was synthesized by means of an Fmoc solid-phase synthesis method well known to those skilled in the art; Fmoc was removed by using Rink-amide Resin and 20% of piperidine/DMF; HOBT/DIC was used as a coupling reagent, and DMF was used as a reaction solvent; the reaction was monitored by a ninhydrin detection method; the following protected amino acids were sequentially coupled to the resin: Fmoc-Cys(Trt)-OH, Fmoc-Glu(OtBu)-OH, Fmoc-Glu(OtBu)-OH, Fmoc-Pro-OH, Fmoc-Pro-OH, Fmoc-Ser(tBu)-OH, Fmoc-Ser(tBu)-OH, Fmoc-Pro-OH, Fmoc-Lys(Dde)-OH; after the protection of Fmoc was removed, the resultant was acetylated with acetic anhydride and pyridine; a solution of hydrazine hydrate in DMF was added, and Dde protecting group was removed; the resultant was sequentially coupled to Fmoc-PEG3-OH and biotin, and then washed with DMF, methanol and DCM, and dried; a lysis reagent (TFA:thioanisole:phenol:EDT=82.5:5:5:2.5:5) was added; after reacting for 2 hours, the mixture was precipitated using ice-cooled TBME and centrifuged to obtain a crude product, which was purified by prep-HPLC and then lyophilized to obtain a pure product.

Example XI

Synthesis of Biotin-Labeled Targeting Polypeptide 4

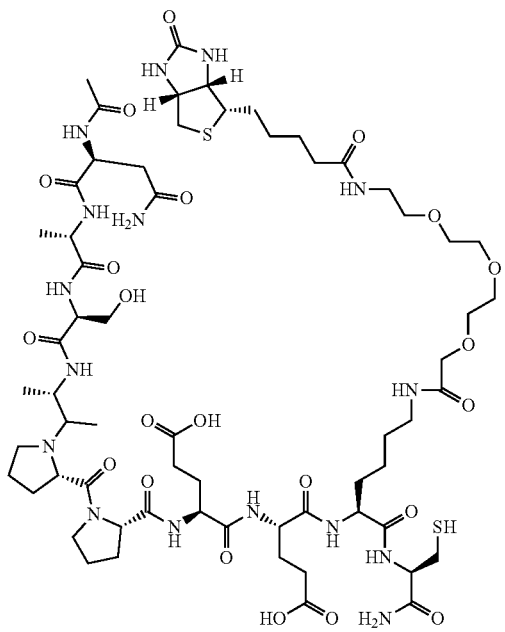 [SMILES: CC(=O)N[C@@H](CC(N)=O)C(=O)N[C@@H](C)C(=O)N[C@@H](CO)C(=O)N[C@@H](C)C(C)N1CCC[C@H]1C(=O)N1CCC[C@H]1C(=O)N[C@@H](CCC(=O)O)C(=O)N[C@@H](CCC(=O)O)C(=O)N[C@@H](CCCCNC(=O)COCCOCCOCCNC(=O)CCCC[C@@H]1SC[C@@H]2NC(=O)N[C@@H]21)C(=O)N[C@@H](CS)C(N)=O]

Biotin-labeled targeting polypeptide 4 was synthesized by means of an Fmoc solid-phase synthesis method well known to those skilled in the art; Fmoc was removed by using Rink-amide Resin and 20% of piperidine/DMF; HOBT/DIC was used as a coupling reagent, and DMF was used as a reaction solvent; the reaction was monitored by a ninhydrin detection method; the following protected amino acids were sequentially coupled to the resin: Fmoc-Cys(Trt)-OH, Fmoc-Lys(Dde)-OH, Fmoc-Glu(OtBu)-OH, Fmoc-Glu(OtBu)-OH, Fmoc-Pro-OH, Fmoc-Pro-OH, Fmoc-Ala-OH, Fmoc-Ser(tBu)-OH and Fmoc-Ala-OH, Fmoc-Asn(Trt)-OH; after the protection of Fmoc was removed, the resultant was acetylated with acetic anhydride and pyridine; a solution of hydrazine hydrate in DMF was added, and Dde protecting group was removed; the resultant was sequentially coupled to Fmoc-PEG3-OH and biotin, and then washed with DMF, methanol and DCM, and dried; a lysis reagent (TFA:thioanisole:phenol:EDT=82.5:5:5:2.5:5) was added; after reacting for 2 hours, the mixture was precipitated using ice-cooled TBME and centrifuged to obtain a crude product, which was purified by prep-HPLC and then lyophilized to obtain a pure product.

Example XII

Preparation of Compound a-Biotin Conjugate

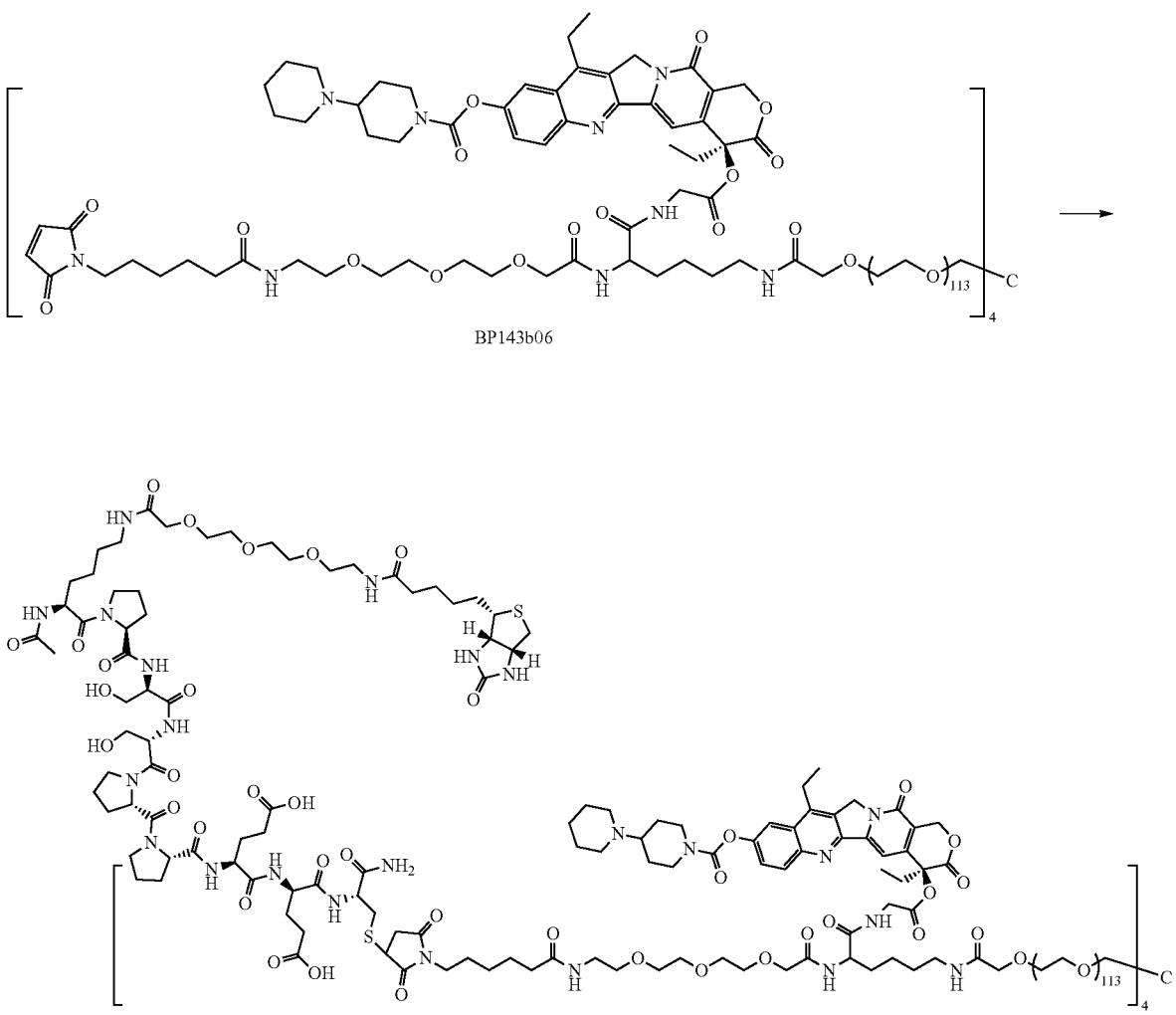

At room temperature, to a 100 ml three-neck reaction flask, 2.00 g (1.0 eq) of BP143b06 and 35 ml of PBS solution at pH=7.0 were added and dissolved with stirring to yield a clear solution; 0.57 g (5.0 eq) of biotin-labeled targeting polypeptide 3 was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.24 g of pure product, which has a molecular weight of 30325.51, detected by MALDI-TOF.

Example XIII

Preparation of Compound b-Biotin Conjugate

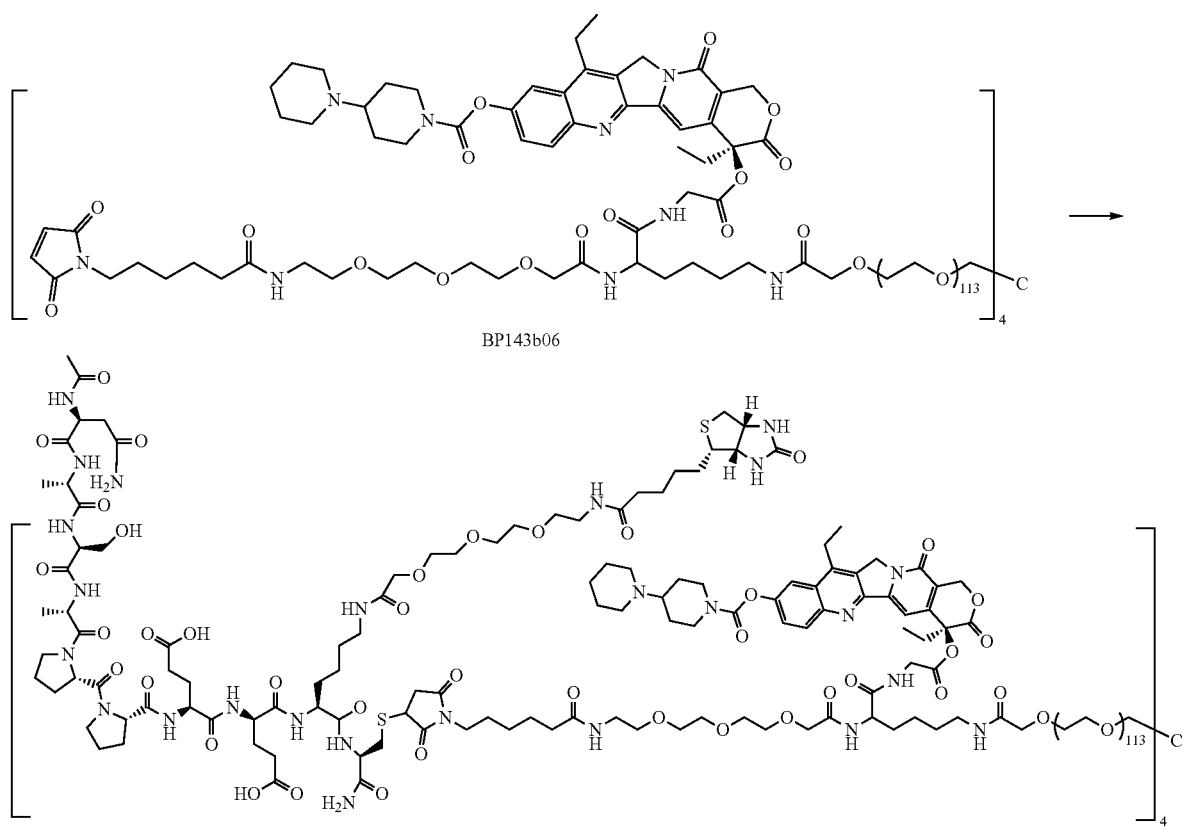

At room temperature, to a 100 m three-neck reaction flask, 2.00 g (1.0 eq) of BP143b06 and 35 ml of PBS solution at pH=7.0 were added and dissolved with stirring to yield a clear solution; 0.60 g (5.0 eq) of biotin-labeled targeting polypeptide 4 was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.33 g of pure product, which has a molecular weight of 30596.56, detected by MALDI-TOF.

Example XIV

Preparation of Compound c-Biotin Conjugate

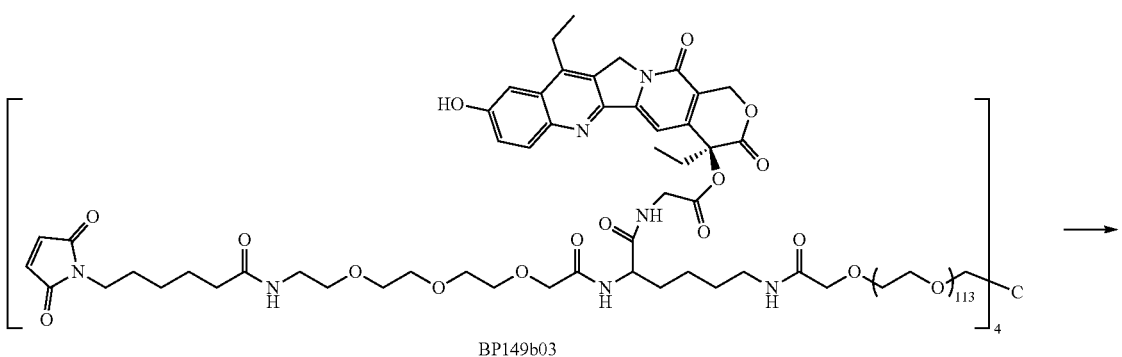

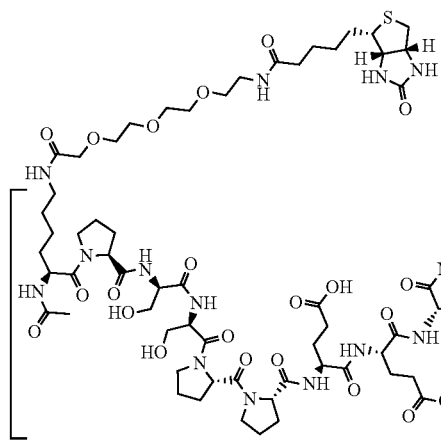
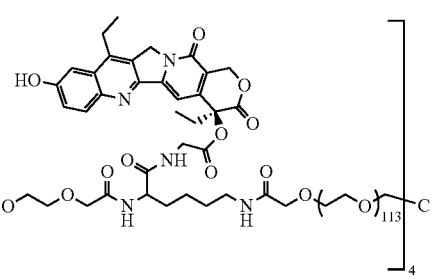

At room temperature, to a 100 ml three-neck reaction flask, 2.00 g (1.0 eq) of BP149b03 and 35 ml of PBS solution at pH=7.0 were added and dissolved with stirring to yield a clear solution; 0.55 g (5.0 eq) of biotin-labeled targeting polypeptide 3 was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.26 g of pure product, which has a molecular weight of 30223.25, detected by MALDI-TOF.

Example XV

Preparation of Compound d-Biotin Conjugate

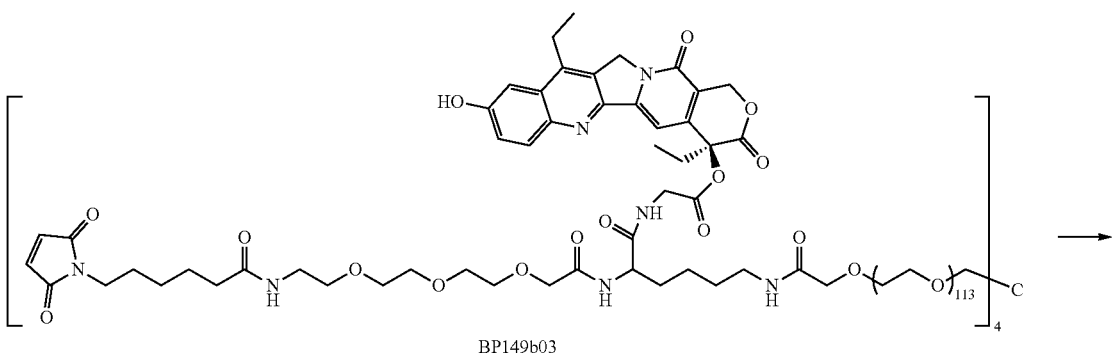

BP149b03

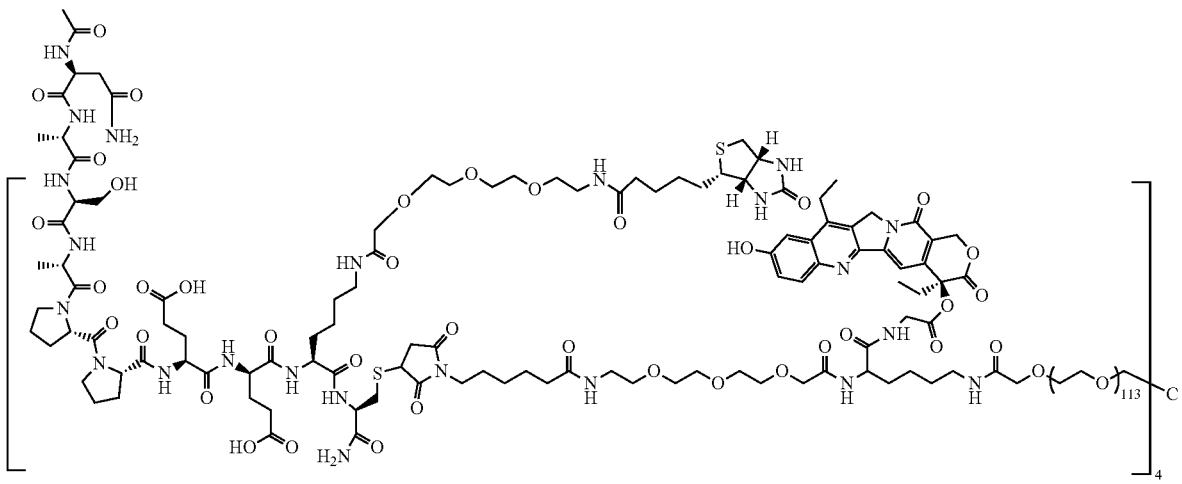

At room temperature, to a 100 ml three-neck reaction flask, 2.00 g (1.0 eq) of BP149b03 and 35 ml of PBS solution at pH=7.0 were added and dissolved with stirring to yield a clear solution; 0.58 g (5.0 eq) of biotin-labeled targeting polypeptide 4 was dissolved in 30 ml of purified water, and the mixture was adjusted to pH≈6.5 with sodium bicarbonate solution and then added to the reaction flask; after 0.5 hours, HPLC detected that the reaction was completed, and the resultant was purified by prep-HPLC and lyophilized to obtain 1.33 g of pure product, which has a molecular weight of 30491.18, detected by MALDI-TOF.

Example XVI

Compound as disclosed specifically binding to CD44

1. Materials and Method 1.1 Biotin-Labeled Conjugates of the Compounds as Disclosed Herein Compound a-biotin conjugate, compound b-biotin conjugate, compound c-biotin conjugate and compound d-biotin conjugate are respectively referred to as conjugate a, conjugate b, conjugate c and conjugate d in experiments, and the structures thereof and the preparation methods therefor are as shown in Examples 10-15.

1.2 Cell Culture

SKOV3 cells were cultured in McCoy's 5A culture solution. The cell culture solution was supplemented with 10% of FBS, 1000 U/mL of penicillin, 100 μg/mL of streptomycin and 4 mmol/L 1-glutamine.

1.3 Binding of Conjugates to SKOV3 Cells 5 mmol/L of bis(sulfosuccinimide)suberate was added to conjugate a, conjugate b, conjugate c and conjugate d (which were respectively dissolved in ice-cooled PBS to achieve a concentration of 100 μmol/L) to allow the conjugates to bind to SKOV3 cells. Triton X-100 lysis buffer was added; cells were lysed and then centrifuged; and the supernatant was transferred to a polyvinylidene fluoride (PVDF) membrane and subjected to western blot analysis. The PVDF membrane was incubated with horseradish peroxidase conjugated streptavidin (HRP-SA), and the protein crosslinked with the conjugates were detected. CD44 was detected by western blot using anti-CD44 monoclonal antibody DF1485 and peroxidase-labeled donkey anti-mouse immunoglobulin. A freshly-formulated chemiluminescence reagent and Hypermax ECL film exposure were used for detection.

1.4 Immunoprecipitation of Conjugate-Labeled Proteins

SKOV3 cells crosslinked with the conjugates were lysed by Triton X-100, incubated with protein A sepharose at room temperature for 2 hours and pre-washed; 100 μg of the washed lysis buffer was incubated with 20 μL of protein A sepharose supplemented with 2 μg of DF1485 (anti-CD44 antibody) or murine IgG1 overnight at room temperature. After washing 5 times with the lysis buffer, the mixture was boiled in an SDS-PAGE loading buffer and the immunoprecipitated protein was eluted from protein A sepharose. The eluted materials and 5 μg of initial materials were added to SDS-PAGE, transferred to a PVDF membrane and then stained with HRP-SA.

2. Results

The SKOV3 cells bind to the conjugates. The lysate prepared from the cells was immunoprecipitated with DF1485. An eluted protein and an initial lysate were subjected to PAGE/blotting, wherein HRP-SA staining was used to detect biotin labels and DF1485 staining was used to detect CD44, respectively.

When the initial lysate, conjugates and HRP-SA were comprised in a reaction system, many non-specific bands appeared in the range of 0-250 kDa; when the initial lysate and HRP-SA were comprised in a reaction system, no band appeared in the range of 0-250 kDa, it was thus indicated HRP-SA staining specifically a conjugate-labeled protein. When the immunoprecipitated protein, conjugates and HRP-SA were comprised in a reaction system, a specific band appeared in 85 kDa; when the immunoprecipitated protein and HRP-SA were comprised in a reaction system, no band appeared in the range of 0-250 kDa, it was thus indicated that a conjugate-labeled protein of about 85 kDa was specifically precipitated by DF1485. Compared with the initial lysate, the staining intensity of the band in the immunoprecipitated protein was more obvious, indicating that the protein was greatly enriched via anti-CD44 immunoprecipitation.

When the initial lysate, conjugates and DF1485 were comprised in a reaction system, a specific band appeared in 85 kDa; when the initial lysate and DF1485 were comprised in a reaction system, a specific band appeared in 85 kDa; when the immunoprecipitated protein, conjugates and DF1485 were comprised in a reaction system, a specific band appeared in 85 kDa; when the immunoprecipitated protein and DF1485 were comprised in a reaction system, a specific band appeared in 85 kDa, it was thus indicated that the band of 85 kDa was CD44, and CD44 was present in all samples.

The above results show that the compound of the present invention specifically binds to CD44, and may target tumor cells and tissues having high expression of CD44, so that the concentration of the conjugate in a target tissue is high, the clinical treatment effect thereof is improved, and toxicity is reduced.

In examples 17-21, all animal experiment operations strictly comply with requirements for animal use and management. With regard to the calculation of tumor-related parameters, reference can be made to "Technical Guidelines for Non-clinical Research of Cytotoxic Anti-tumor Drugs"

(November 2006) from China CFDA, wherein % T/C<40% and P<0.05 according to a statistical analysis indicate being effective. The lower the relative tumor proliferation rate, the better the anti-tumor effect.

The calculation formula of tumor volume (TV) is: $TV(mm^3) = l \times w^2/2$, wherein, l represents long diameter (mm) of tumor; and w represents short diameter (mm) of tumor.

The calculation formula of relative tumor volume (RTV) is: $RTV = TV_t/TV_{initial}$, wherein, $TV_{initial}$ represents the tumor volume measured at grouping and administration, and $TV_t$ represents the tumor volume at each measurement during administration.

The calculation formula of relative tumor proliferation rate (% T/C) is:

$$\% T/C = 100\% \times (RTV_T/RTV_C),$$

wherein, $RTV_T$ represents the RTV of a treatment group, and $RTV_C$ represents the RTV of a solvent control group.

The calculation formula of tumor growth inhibition TGI (%) is:

$$TGI = 100\% \times [1 - (TV_{t(T)} - TV_{initial(T)})/(TV_{t(C)} - TV_{initial(C)})],$$

wherein, $TV_{t(T)}$ represents the tumor volume of a treatment group at each measurement; $TV_{initial(T)}$ represents the tumor volume of a treatment group at grouping and administration; $TV_{t(C)}$ represents the tumor volume of a solvent control group at each measurement; and $TV_{initial(C)}$ represents the tumor volume of a solvent control group at grouping and administration.

The calculation formula of decreasing rate of animal body weight is: Decreasing rate of animal body weight=$100\% \times (BW_{initial} - BW_t)/BW_{initial}$, wherein, $BW_t$ represents the body weight of animal at each measurement during administration; and $BW_{initial}$ represents the body weight of animal at grouping and administration.

The calculation formula of tumor weight inhibition ratio IR (%) is:

$$IR(\%) = 100\% \times (W_C - W_T)/W_C,$$

wherein, $W_C$ represents the tumor weight of control group, and $W_T$ represents the tumor weight of a treatment group.

The test data was calculated and subjected to related statistical processing with Microsoft Office Excel 2007 software. Unless otherwise specified, data was represented as mean±standard error (Mean±SE); t-test was used to compare data between groups; and P<0.05 was considered statistically significant.

Experimental animals: female BALB/c nude mice (6-8 weeks old) was normally fed for about 1 week; after veterinary examination, mice with good physical signs were selected for this experiment. Before grouping, the mice were marked using a marking pen on the base of the tail and grouped, and then each mouse was marked by eartipping.

Preparation of administration formulations of compound M, compound a and compound b: a drug was accurately weighed before each administration; 2.5 mL of physiological saline was added, and vortexing was performed to completely dissolve the drug; and the effective concentration of irinotecan in the solution was 4.0 mg·mL$^{-1}$.

Preparation of administration formulations of compound c and compound d: a drug was accurately weighed before each administration; 2.5 mL of physiological saline was added, and vortexing was performed to completely dissolve the drug; and the effective concentration of SN38 in the solution was 4.0 mg·mL$^{-1}$.

Randomized grouping: the mice were inoculated with tumor cells, and when the tumor volume reached 100-300 mm$^3$, the mice were divided into 6 groups according to a randomized block method, with 6 mice per group and uniform tumor volume and body weight among the groups. The difference between the mean tumor volume of each group and the mean tumor volume of all experimental animals did not exceed±10%.

After starting the experiment, the tumor diameter was measured twice a week to calculate the tumor volume, and the body weight was also weighed and recorded.

Administration to mice in examples 17-20 comprises: a first administration on the day of grouping. The first group was a solvent control group, in which physiological saline was administrated by tail vein injection. Groups 2-6 were respectively administrated with test samples: compound M, compound a, compound b, compound c and compound d, by tail vein injection.

After completion of the experiment, the mice were euthanized ($CO_2$) after the body weight was weighed, and the tumor diameter was measured. Tumor tissues were stripped and weighed, and RTV and % T/C were calculated.

The control test sample compound M involved in examples was disclosed in Chinese patent application CN 108727583 A, and has a structure as follows:

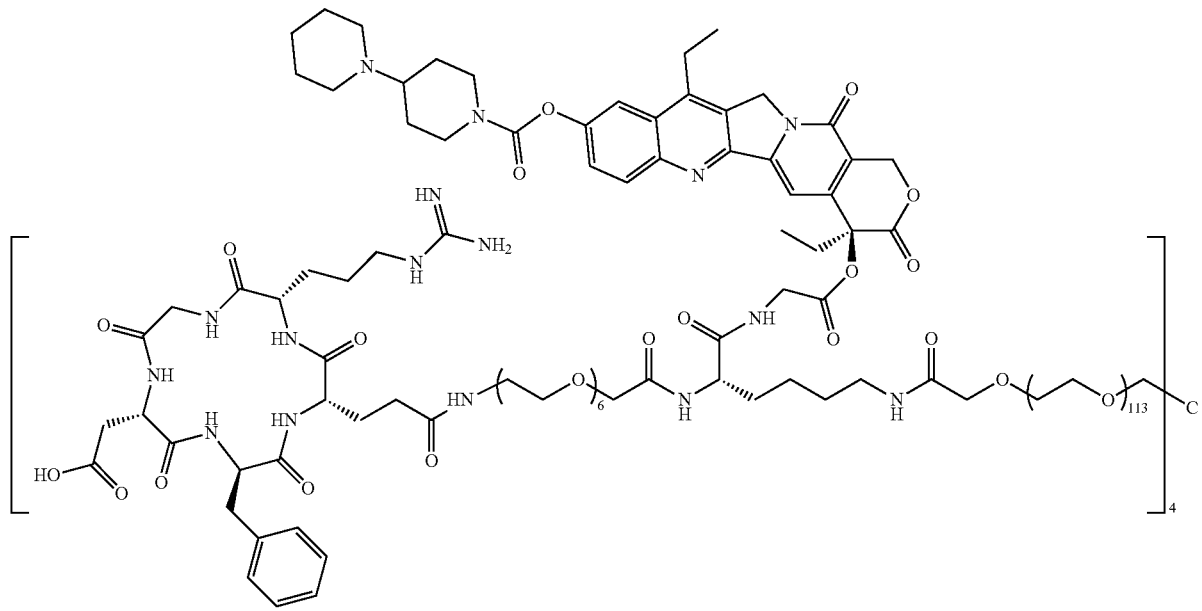

Example XVII

Anti-Tumor Pharmacodynamic Experiment of the Compound of the Present Invention for Xenograft Tumor of Human Breast Cancer MDA-MB-231 in Nude Mice Test samples: compound M, compound a, compound b, compound c and compound d.

Reagents: DMEM culture solution, fetal bovine serum (FBS), trypsin, penicillin-streptomycin double antibody and physiological saline.

Transplanted tumor strain: human breast cancer MDA-MB-231, derived from the Cell Bank of Type Culture Collection Committee of Chinese Academy of Sciences (CAS) and cryopreserved in liquid nitrogen in our laboratory.

Cell culture: MDA-MB-231 strains were cultured in a DMEM medium (DMEM, USA) containing 10% fetal bovine serum FBS (GIBCO, USA), and cultured in an incubator at 37° C. with 5% $CO_2$.

Preparation of animal model: a subcutaneous transplanted tumor model in nude mice was established using a cell inoculation method; tumor cells at the logarithmic growth phase were collected, counted and resuspended in 1×PBS, and the concentration of the cell suspension was adjusted to $1×10^7$ cells/ml. The tumor cells were inoculated subcutaneously on the right back of nude mice ($1×10^6$ cells/mouse) using a 1 ml syringe (4-gauge needle).

Frequency and dosage of administration: each group was administered once a week for a total of three times (QW×3), and each dosage of administration was 6 mg·$kg^{-1}$ (calculated as irinotecan or SN38).

The results are shown in Table 1.

TABLE 1

| | | | Relative tumor proliferation rate T/C (%) | |
|---|---|---|---|---|
| Group | Sample | Number of mice | Relative tumor volume (RTV) | Relative tumor proliferation rate (% T/C) |
| 1 | Blank solvent | 6 | 13.52 | — |
| 2 | Compound M | 6 | 2.34 | 17.3% |
| 3 | Compound a | 6 | 0.109* | 0.81%[#] |
| 4 | Compound b | 6 | 0.254* | 1.89%*[#] |
| 5 | Compound c | 6 | 0.417* | 3.10%[#] |
| 6 | Compound d | 6 | 0.262* | 1.95%[#] |

*Compared with the RTV of blank solvent group and compound M group, P < 0.05
[#]Compared with the % T/C of blank solvent group and compound M group, P < 0.05

The experimental results show that, the compound of the present invention has a good inhibitory effect on transplanted tumor of human breast cancer MDA-MB-231 in nude mice, and the effect was better than that of compound M.

Example XVIII

Inhibitory Effect of the Compound of the Present Invention on Tumor Growth In Vivo of Transplanted Tumor Model of Human Gastric Cancer NCI-N87 Cell Strain in Nude Mice.

Test samples: compound M, compound a, compound b, compound c and compound d.

Reagents: RPMI-1640 culture solution, fetal bovine serum (FBS), trypsin, penicillin-streptomycin double antibody and physiological saline.

Transplanted tumor strain: human gastric cancer NCI-N87, derived from the Cell Bank of Type Culture Collection Committee of Chinese Academy of Sciences (CAS) and cryopreserved in liquid nitrogen in our laboratory.

Cell culture: under 5% $CO_2$ and 37° C., NCI-N87 cells were routinely cultured in an RPMI-1640 culture solution containing 10% fetal bovine serum, and subjected to digestion with 0.25% trypsin and passaged; according to cell growth, the cells were passaged 1 to 2 times a week with a passage ratio of 1:2 to 1:6.

Preparation of animal model: NCI-N87 cells at the logarithmic growth phase were collected, counted and resuspended in a serum-free RPMI-1640 medium, and the concentration of cells was adjusted to $5 \times 10^7$ cells/mL; the cells were pipetted to uniformly disperse and then transferred into a 50 mL centrifuge tube, which was then placed in an ice box; the cell suspension was suctioned using a 1 mL syringe and subcutaneously injected into the right front armpit of nude mice, and each mouse was inoculated with 100 μL ($5 \times 10^6$ cells/mouse) to establish an NCI-N87 transplanted tumor model in nude mice.

Frequency and dosage of administration: each group was administered once a week for a total of four times (QW×4), and each dosage of administration was 200 mg·kg$^{-1}$.

The results are shown in Table 2:

TABLE 2

Relative tumor proliferation rate T/C (%)

| Group | Sample | Number of mice | Relative tumor volume (RTV, mm$^3$) | Mean relative tumor proliferation rate (% T/C) |
|---|---|---|---|---|
| 1 | Blank solvent | 6 | 7.31 | — |
| 2 | Compound M | 6 | 1.22 | 17.00% |
| 3 | Compound a | 6 | 0.601* | 8.20%[#] |
| 4 | Compound b | 6 | 0.687* | 9.37%[#] |
| 5 | Compound c | 6 | 0.705* | 9.62%[#] |
| 6 | Compound d | 6 | 0.653* | 8.91%[#] |

*Compared with the RTV of blank solvent group and compound M group, P < 0.05
[#]Compared with the % T/C of blank solvent group and compound M group, P < 0.05

The experimental results show that, the compound of the present invention has a good inhibitory effect on tumor growth of transplanted tumor model of human gastric cancer NCI-N87 cell strain in nude mice, and the effect was better than that of compound M.

Example XIX

Evaluation for In Vivo Efficacy of HT-29 Transplanted Tumor Model in Nude Mice

Test samples: compound M, compound a, compound b, compound c and compound d.

Reagents: McCoy's 5A culture solution, fetal bovine serum (FBS), trypsin, penicillin-streptomycin double antibody, water for injection, physiological saline, lactic acid, and sorbitol.

Transplanted tumor strain: human colon cancer HT-29, derived from the Cell Bank of Type Culture Collection Committee of Chinese Academy of Sciences (CAS) and cryopreserved in liquid nitrogen in our laboratory.

Cell culture: under 5% $CO_2$ and 37° C., HT-29 cells were routinely cultured in a McCoy's 5A culture solution containing 10% fetal bovine serum, and subjected to digestion with 0.25% trypsin and passaged; according to cell growth, the cells were passaged 2 to 3 times a week with a passage ratio of 1:4 to 1:6.

Preparation of animal model: HT-29 cells at the logarithmic growth phase were collected, counted and resuspended in a serum-free McCoy's 5A medium, and the concentration of cells was adjusted to $4 \times 10^7$ cells/mL; the cells were pipetted to uniformly disperse and then transferred into a 50 mL centrifuge tube, which was then placed in an ice box; the cell suspension was suctioned using a 1 mL syringe and subcutaneously injected into the right front armpit of nude mice, and each mouse was inoculated with 100 μL ($4 \times 10^6$ cells/mouse) to establish an HT-29 transplanted tumor model in nude mice.

Frequency and dosage of administration: each group was administered once a week for a total of four times (QW×4), and each dosage of administration was 200 mg·kg$^{-1}$.

The results are shown in Table 3:

TABLE 3

Relative tumor proliferation rate T/C (%)

| Group | Sample | Number of mice | Relative tumor volume (RTV) | Relative tumor proliferation rate (% T/C) |
|---|---|---|---|---|
| 1 | Blank solvent | 6 | 9.76 | — |
| 2 | Compound M | 6 | 2.63 | 27% |
| 3 | Compound a | 6 | 0.479* | 4.9%[#] |
| 4 | Compound b | 6 | 1.045* | 10.23%[#] |
| 5 | Compound c | 6 | 0.837* | 8.56%[#] |
| 6 | Compound d | 6 | 0.812* | 8.31%[#] |

*Compared with the RTV of blank solvent group and compound M group, P < 0.05
[#]Compared with the % T/C of blank solvent group and compound M group, P < 0.05

The experimental results show that, the compound of the present invention has a good inhibitory effect on in vivo tumor growth of transplanted tumor model of human colon cancer HT-29 cell strain in nude mice, and the effect was better than that of compound M.

Example XX

Inhibitory Effect on Xenograft Model of Human Pancreatic Cancer MIA Paca-2 in Nude Mice Test samples: compound M, compound a, compound b, compound c and compound d.

Transplanted tumor strain: human pancreatic cancer MIA Paca-2, purchased from Shanghai Institute of Biochemistry and Cell Biology, Chinese Academy of Sciences.

Cell culture: MIA Paca-2 cells were cultured in DMEM containing 10% fetal bovine serum FBS (GIBCO, USA) and 2.5% HS; and the cells were placed in an incubator with 5% $CO_2$ at 37° C.

Preparation of animal model: a subcutaneous transplanted tumor model of human pancreatic cancer MIA Paca-2 in nude mice was established using a cell inoculation method; tumor cells at the logarithmic growth phase were collected, counted and resuspended in 1×PBS, and the concentration of the cell suspension was adjusted to $3 \times 10^7$ cells/ml. The tumor cells were inoculated subcutaneously on the right back of nude mice ($3 \times 10^6$ cells/0.1 ml/mouse) using a 1 ml syringe (4-gauge needle).

Frequency and dosage of administration: each group was administered once a week for a total of three times (QW×3), and each dosage of administration was 6 mg·kg$^{-1}$.

The results are shown in Table 4:

TABLE 4

Relative tumor proliferation rate T/C (%)

| Group | Sample | Number of mice | Relative tumor volume (RTV) | Relative tumor proliferation rate (% T/C) |
|---|---|---|---|---|
| 1 | Blank solvent | 6 | 13.1 | — |
| 2 | Compound M | 6 | 2.85 | 22% |

TABLE 4-continued

Relative tumor proliferation rate T/C (%)

| Group | Sample | Number of mice | Relative tumor volume (RTV) | Relative tumor proliferation rate (% T/C) |
|---|---|---|---|---|
| 3 | Compound a | 6 | 0.361* | 2.7%# |
| 4 | Compound b | 6 | 0.678* | 5.07# |
| 5 | Compound c | 6 | 0.537* | 4.02# |
| 6 | Compound d | 6 | 0.732* | 5.47# |

*Compared with the RTV of blank solvent group and compound M group, P < 0.05
Compared with the % T/C of blank solvent group and compound M group, P < 0.05

The experimental results show that, the compound of the present invention has a good inhibitory effect on transplanted tumor of human pancreatic cancer MIA Paca-2 in nude mice, and the effect was better than that of compound M.

Example XXI

Inhibitory Effect on Xenograft Model of Human Small Cell Lung Cancer Cell NCI-H446 in Nude Mice Test samples: irinotecan, nktr-102, compound a, compound b, compound c and compound d.

Irinotecan (bulk drug) was purchased. The preparation method for nktr-102 comprises:

BP143b03 (829 mg, 4.5 eq) in example 4 was added to a 250 mL reaction flask; DCM (50 mL) and triethylamine (221 m g, 9.0 eq) were added and dissolved; and then 4ARM-PEG20K-SCM (5.00 g, 1.0 eq) was added to the reaction flask. After HPLC monitored that there was no obvious progress in the reaction, about 20 mL of DCM was distilled off under reduced pressure; the solution was poured into 300 mL of TBME, stirred, precipitated and filtered to obtain 5.4 g of crude product, which was purified by prep-HPLC, desalted, adjusted to about pH 5-6 with dilute hydrochloric acid, and lyophilized to obtain 2.71 g of nktr-102 as a light green powder.

Preparation of administration formulation of irinotecan: 12.0 mg of irinotecan was weighed; 0.15 mL of 1% lactic acid was added, and vortexing was performed to completely dissolve the drug; then 2.85 mL of 1% sorbitol aqueous solution was added, and the mixture was vortexed to uniformly mix the solution, in which the ratio of 1% lactic acid to 1% sorbitol aqueous solution was about 5:95 (v/v), and the effective concentration of irinotecan was 4.0 mg·mL$^{-1}$.

Preparation of administration formulation of nktr-102: 101.5 mg of nktr-102 was accurately weighed before each administration; 2.5 mL of physiological saline was added, and vortexing was performed to completely dissolve the drug; and the effective concentration of irinotecan in the solution was 4.0 mg·mL$^{-1}$.

Transplanted tumor strain: small cell lung cancer cell NCI-H446, derived from the Cell Bank of Type Culture Collection Committee of Chinese Academy of Sciences.

Cell culture: Under 5% $CO_2$, 37° C. and saturated humidity, NCI-H446 cells were routinely cultured in an RPMI-1640 culture solution containing 10% fetal bovine serum, and according to cell growth, the cells were subjected to digestion with 0.25% trypsin and passaged 2 to 4 times a week with a passage ratio of 1:3 to 1:4.

Preparation of animal model: a subcutaneous transplanted tumor model in nude mice was established using a cell inoculation method; NCI-H446 cells at the logarithmic growth phase were collected, counted and resuspended in a minimal medium containing 50% of RPMI-1640 and 50% of Matrigel; and the concentration of cells was adjusted to $4 \times 10^7$ cells/mL; the cells were pipetted to uniformly disperse and then transferred into a 50 mL centrifuge tube, which was then placed in an ice box; the cell suspension was suctioned using a suitable syringe and subcutaneously injected into the right front armpit of nude mice, and each mouse was inoculated with 200 μL ($8 \times 10^6$ cells/mouse) to establish an NCI-H446 transplanted tumor model in nude mice.

Administration to mice comprises: a first administration on the day of grouping. The first group was a solvent control group, in which physiological saline was administrated by tail vein injection. Groups 2-7 were respectively administrated with test samples: irinotecan, nktr102, compound M, compound a, compound b, compound c and compound d, by tail vein injection; each group was administered once a week for a total of three times (QW×3), and each dosage of administration was 6 mg·kg$^{-1}$.

The results are shown in Table 5:

TABLE 5

Relative tumor proliferation rate T/C (%)

| Group | Sample | Number of mice | Relative tumor volume (RTV) | Relative tumor proliferation rate (% T/C) |
|---|---|---|---|---|
| 1 | Blank solvent | 6 | 8.10 | — |
| 2 | Irinotecan | 6 | 5.34 | 66.0% |
| 3 | nktr-102 | 6 | 3.78 | 46.73% |
| 4 | Compound a | 6 | 0.364* | 4.5%# |
| 5 | Compound b | 6 | 1.09* | 13.48# |
| 6 | Compound c | 6 | 0572.* | 7.07# |
| 7 | Compound d | 6 | 0.893* | 11.04# |

*Compared with the RTV of blank solvent group, irinotecan group and nktr102 group, P < 0.05
Compared with the % T/C of blank solvent group, irinotecan group and nktr102 group, P < 0.05

The experimental results show that, the compound of the present invention has a good inhibitory effect on transplanted tumor of human small cell lung cancer NCI-H446 in nude mice, and the effect was better than that of irinotecan and nktr102.

The disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multi-branched drug conjugate of structural formula (I) or a pharmaceutically acceptable salt thereof:

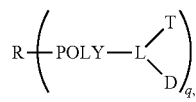

(I)

wherein R is an organic core, POLY is a polymer, L is a multivalent linker, T is a targeting molecule, D is an active agent and q is any integer between 3-8, wherein D is a camptothecin-based drug represented by:

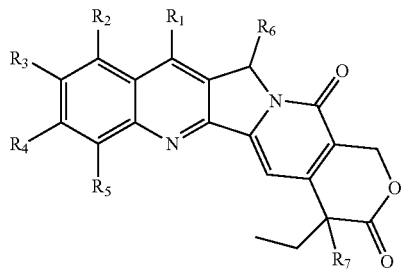

wherein $R_1$-$R_5$ are selected from a group independently from each other: hydrogen, halogen, acyl, alkyl, substituted alkyl, alkoxy, substituted alkoxy, alkenyl, alkynyl, cycloalkyl, hydroxy, cyano, nitro, azido, amido, hydrazine, amine, substituted amine, hydroxycarbonyl, alkoxycarbonyl, alkoxycarbonyloxy, optionally substituted carbamoyloxy, arylsulfonyloxy, alkylsulfonyloxy and $R_9C(O)O$—, wherein $R_9$ is halogen, amino, substituted amino, heterocycle and substituted heterocycle; $R_6$ is H or $OR_8$; $R_8$ is alkyl, alkenyl, cycloalkyl, haloalkyl or hydroxy alkyl; $R_7$ is hydroxy, amino or thiol;

and T is a CD44-targeted polypeptide.

2. The multi-branched drug conjugate or the pharmaceutically acceptable salt thereof according to claim 1,

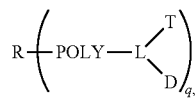

(I)

wherein R is an organic core, POLY is a polymer, L is a multivalent linker, T is a targeting molecule, D is an active agent and q is any integer between 3-8, wherein D is a camptothecin-based drug represented by:

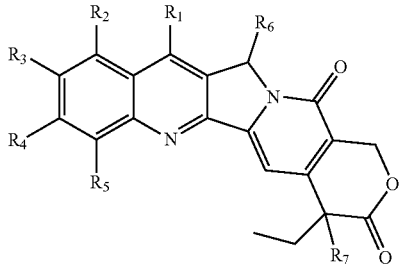

wherein $R_1$-$R_5$ are selected from a following groups independently from each other: hydrogen, halogen, acyl, alkyl, substituted alkyl, alkoxy, substituted alkoxy, alkenyl, alkynyl, cycloalkyl, hydroxy, cyano, nitro, azido, amido, hydrazine, amine, substituted amine, hydroxycarbonyl, alkoxycarbonyl, alkoxycarbonyloxy, carbamoyloxy, arylsulfonyloxy and alkylsulfonyloxy; $R_6$ is H or $OR_8$; $R_8$ is alkyl, alkenyl, cycloalkyl, haloalkyl or hydroxyalkyl; $R_7$ is hydroxy;

and T is a CD44-targeted polypeptide.

3. The multi-branched drug conjugate or the pharmaceutically acceptable salt thereof according to claim 1, wherein POLY is polyethylene glycol, polypropylene glycol, poly (vinylpyrrolidone), poly (hydroxyalkyl methacrylate amine), poly (hydroxyalkyl methacrylate), poly (saccharide), poly (a-hydroxy acid), poly (acrylic acid), poly (vinyl acetate), polyphosphazine, polyoxazoline or poly (N-acryloylmorpholine).

4. The multi-branched drug conjugate or the pharmaceutically acceptable salt thereof according to claim 3, wherein POLY is

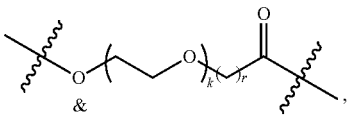

wherein k is 5-500; r is any integer between 1-10; an a oxygen atom marked with a "&" is an atom attached to an organic core R; and the k represents an average number of repeating units.

5. The multi-branched drug conjugate or the pharmaceutically acceptable salt thereof according to claim 4, which is:

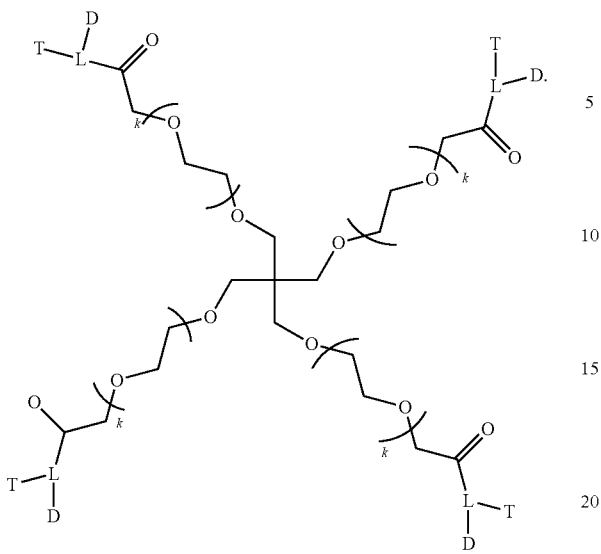

6. The multi-branched drug conjugate or the pharmaceutically acceptable salt thereof according to claim 5, wherein a multivalent linker L is

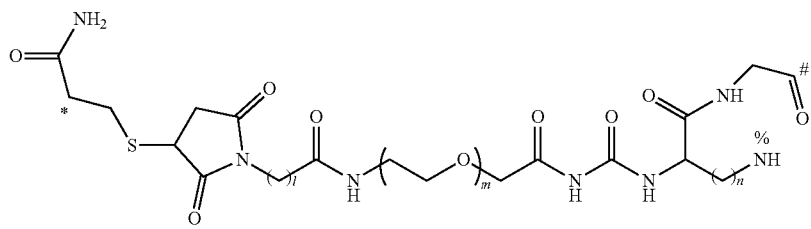

wherein a symbol "*" represents an attachment point of a multivalent linker L to a targeting molecule T, "#" represents an attachment point of the multivalent linker L to an active agent D, and "%" represents an attachment point of the multivalent linker L to the POLY, wherein m is any integer between 1-20, and/and n are independently any integer between 1-10.

7. The multi-branched drug conjugate or the pharmaceutically acceptable salt thereof according to claim 6, wherein D is irinotecan or SN38.

8. The multi-branched drug conjugate or the pharmaceutically acceptable salt thereof according to claim 1, wherein T is Ac-KPSSPPEE-NH$_2$, Ac-NASAPPEE-NH$_2$, hyaluronic acid (HA), osteopontin (OPN), serglycin, collagen, fibrone laminin, chondroitin sulfate C (CSC), heparan sulfate (HS), ankyrin, Galectin-3, L-selectin, P-selectin, C-type lectin or addressin.

9. The multi-branched drug conjugate or the pharmaceutically acceptable salt thereof according to claim 1, wherein T is Ac-KPSSPPEE-NH$_2$ or Ac-NASAPPEE-NH$_2$, and a substitution variant, an addition variant and a chemically-modified derivative thereof.

10. The multi-branched drug conjugate or the pharmaceutically acceptable salt thereof according to claim 8, which is:

Compound A
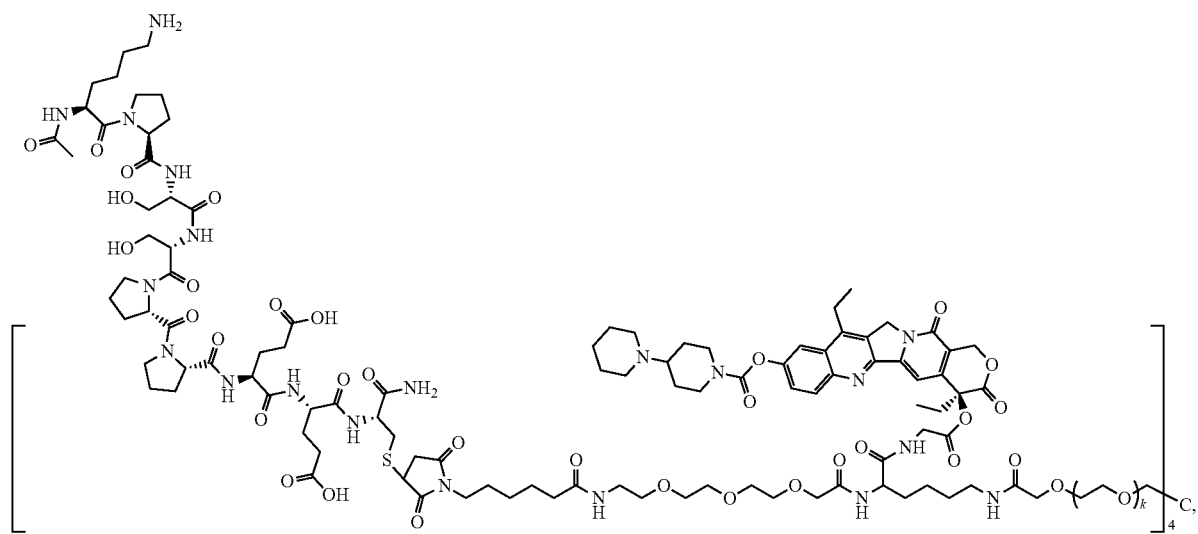
Compound B
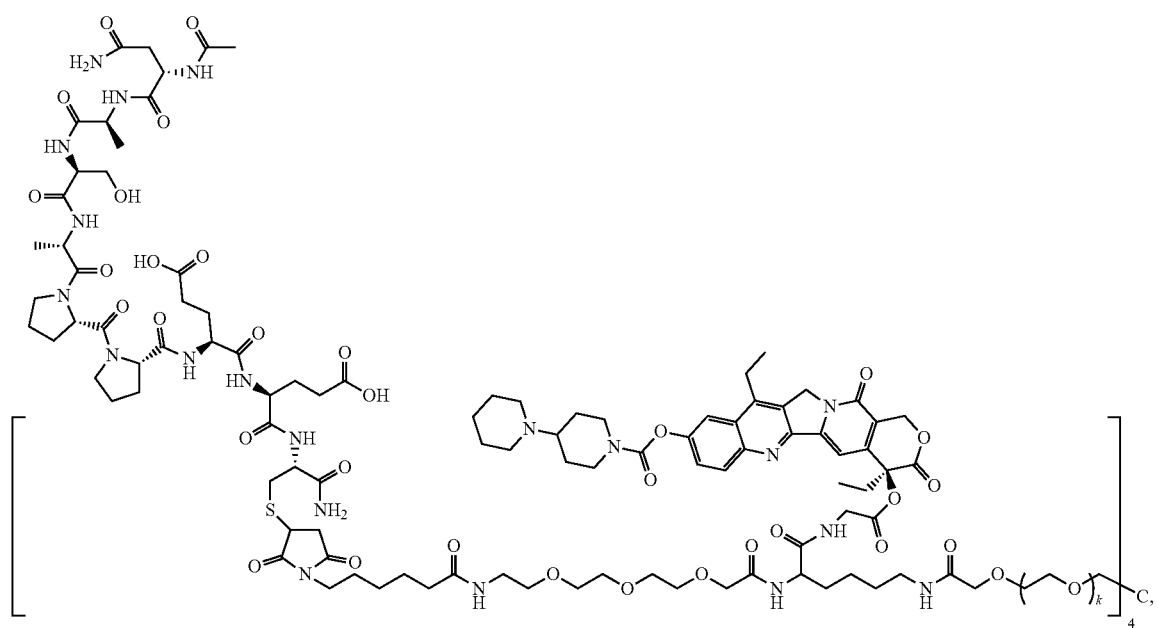

Compound C
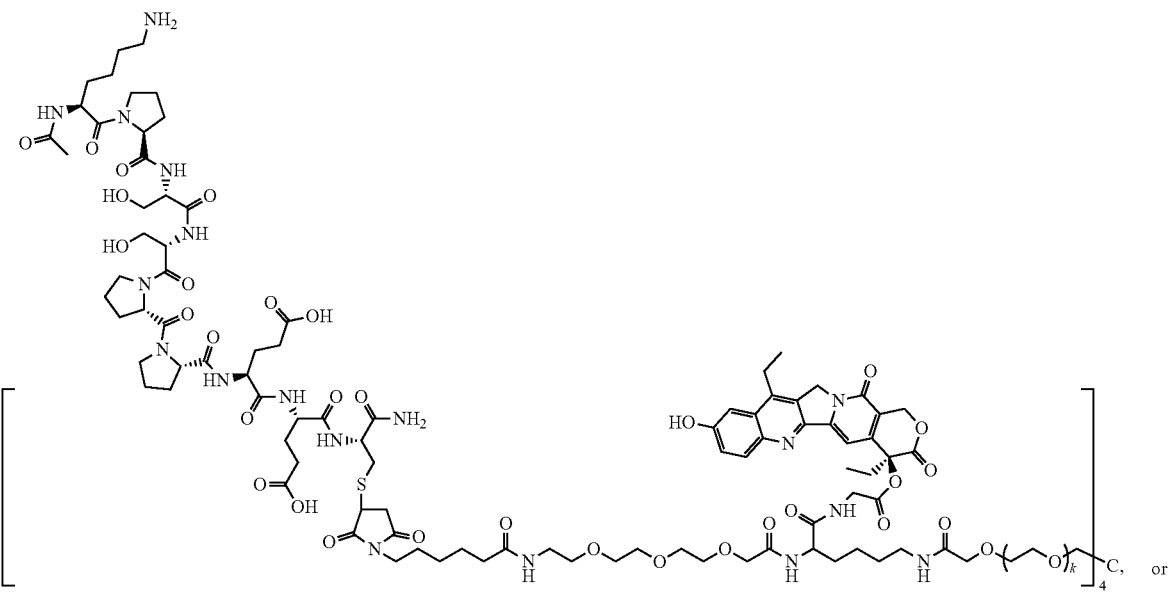
Compound D
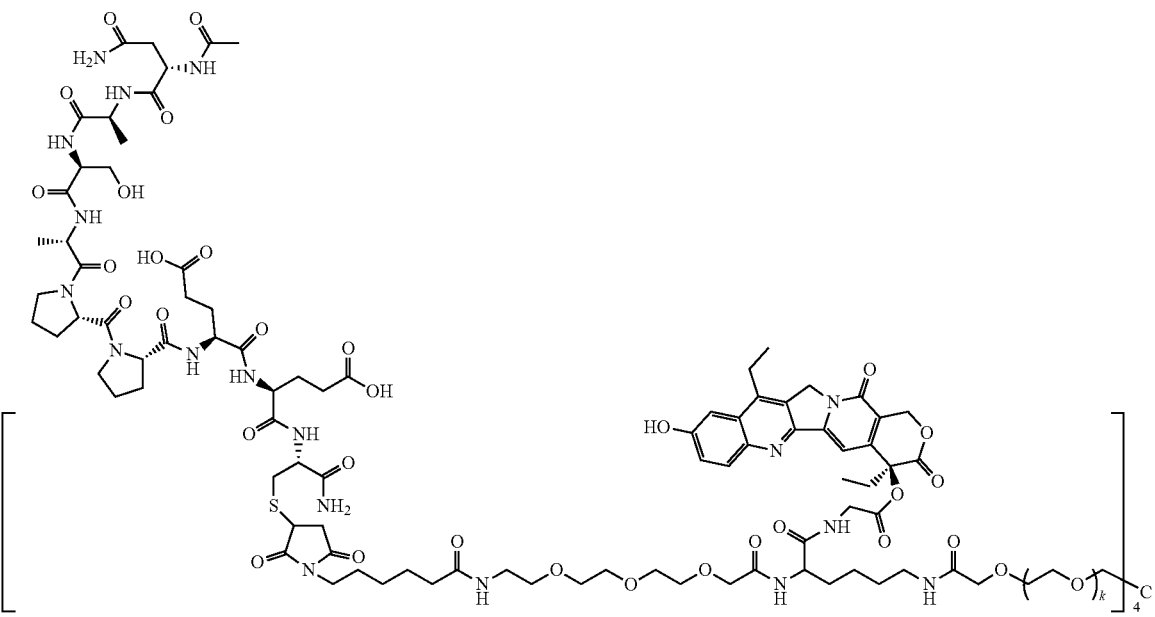
wherein each k in molecular structures of compound A, compound B, compound C and compound D is independently 101-125.

11. The multi-branched drug conjugate or the pharmaceutically acceptable salt thereof according to claim 9, which is:
Compound a
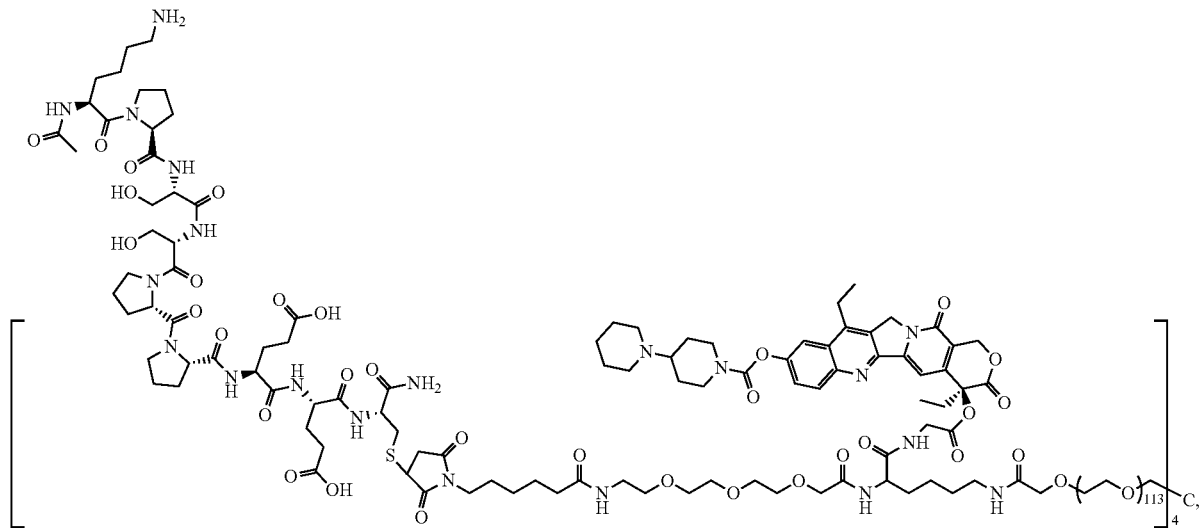
Compound b
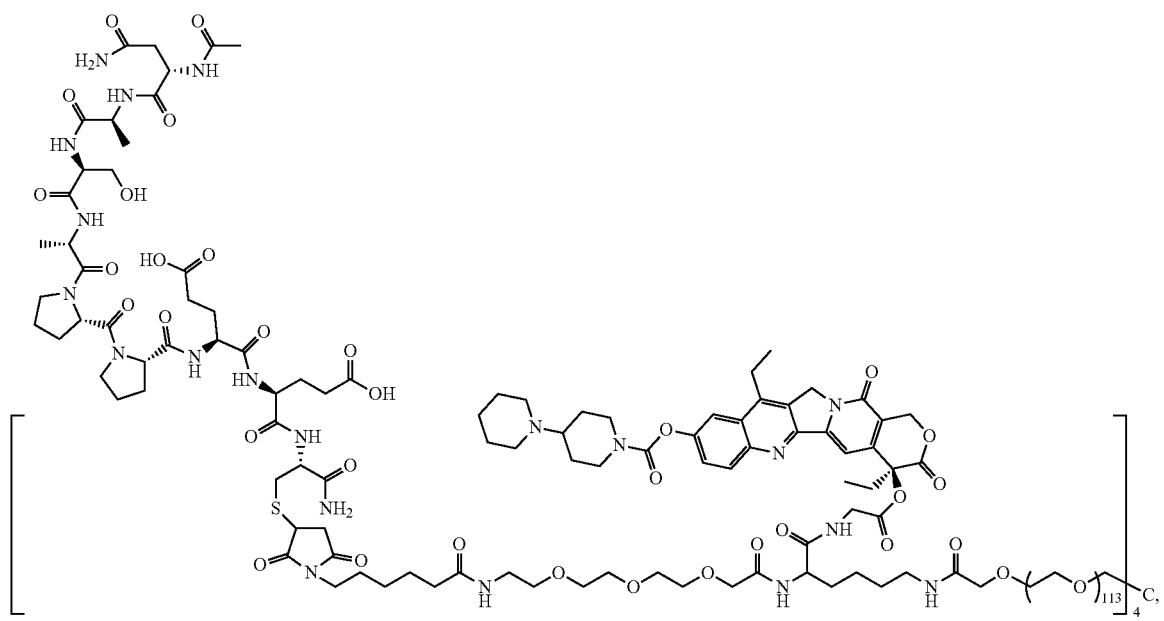

-continued

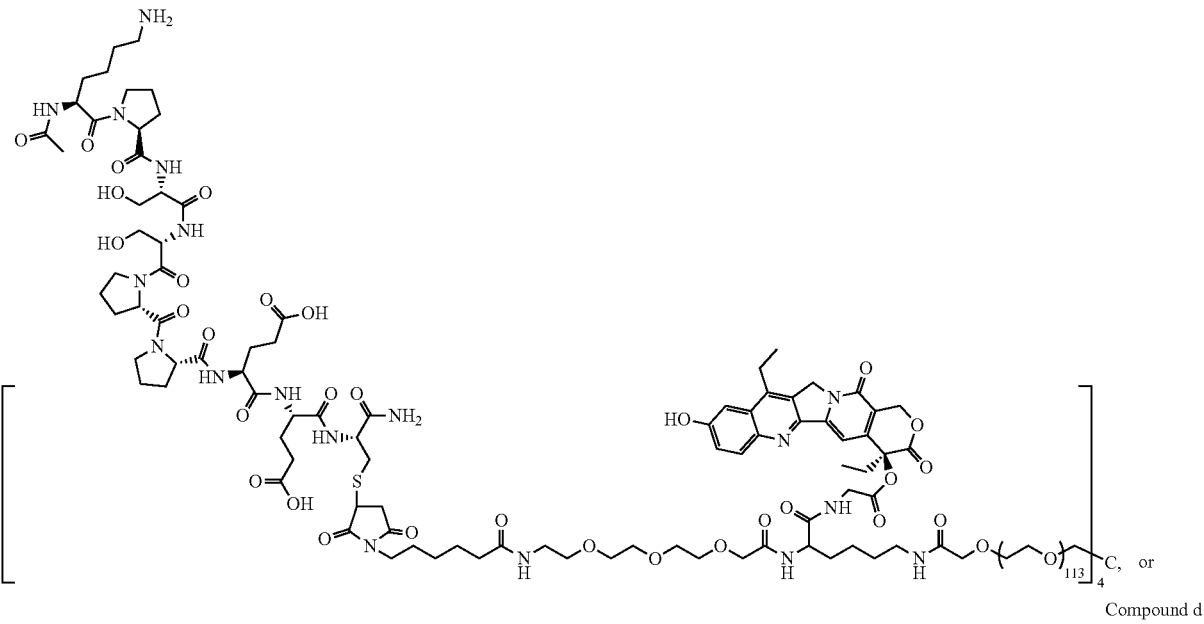
Compound c

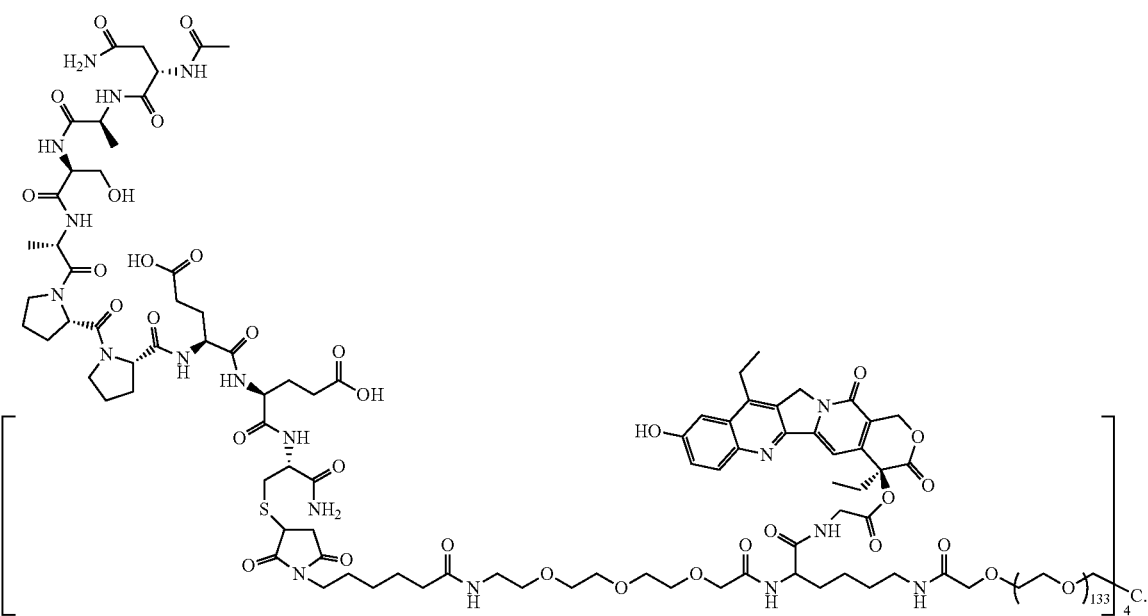
Compound d

12. The multi-branched drug conjugate or the pharmaceutically acceptable salt thereof according to claim 11, which is: a hydrochloride of compound a, compound b, compound c and compound d, in which each branched chain is respectively bonded to one or two molecules of hydrochloric acid; or an acetate of compound a, compound b, compound c and compound d, in which each branched chain is respectively bonded to one or two molecules of acetic acid.

13. A method for treating tumors having high expression of CD44, comprising administering an effective amount of the multi-branched drug conjugate according to claim 1 to a subject in need thereof.

14. The method according to claim 13, wherein the tumors having high expression of CD44 are selected from gastric cancer, pancreatic cancer, small cell lung cancer, colon cancer, breast cancer, lung adenocarcinoma, liver cancer, nasopharyngeal carcinoma, malignant glioma, lymphoma, renal carcinoma, ovarian cancer, head and neck cancer and squamous cell carcinoma.

15. A pharmaceutical composition, comprising the multi-branched drug conjugate or the pharmaceutically acceptable salt according to claim 1, and a pharmaceutically acceptable excipient.

16. A method for treating tumors having high expression of CD44, comprising administering an effective amount of the pharmaceutical composition according to claim 15 to a subject in need thereof.

17. The method according to claim 16, wherein the tumors having high expression of CD44 are selected from gastric cancer, pancreatic cancer, small cell lung cancer, colon cancer, breast cancer, lung adenocarcinoma, liver cancer, nasopharyngeal carcinoma, malignant glioma, lymphoma, renal carcinoma, ovarian cancer, head and neck cancer and squamous cell carcinoma.

18. The multi-branched drug conjugate or the pharmaceutically acceptable salt thereof according to claim 4, wherein k is 50-200.

19. The multi-branched drug conjugate or the pharmaceutically acceptable salt thereof according to claim 6, wherein/is 5, m is 3 and n is 4.

20. The multi-branched drug conjugate or the pharmaceutically acceptable salt thereof according to claim 10, wherein each k is independently 113.

* * * * *

SEQUENCE LISTING

<160> NUMBER OF SEQ ID NOS: 10

<210> SEQ ID NO 1

```
<211> LENGTH: 8
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: CD44-targeted polypeptide
<220> FEATURE:
<221> NAME/KEY: MOD_RES
<222> LOCATION: 8..8
<223> OTHER INFORMATION: AMIDATION

<400> SEQUENCE: 1

Lys Pro Ser Ser Pro Pro Glu Glu
1               5

<210> SEQ ID NO 2
<211> LENGTH: 8
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: CD44-targeted polypeptide
<220> FEATURE:
<221> NAME/KEY: MOD_RES
<222> LOCATION: 8..8
<223> OTHER INFORMATION: AMIDATION

<400> SEQUENCE: 2

Asn Ala Ser Ala Pro Pro Glu Glu
1               5

<210> SEQ ID NO 3
<211> LENGTH: 14
<212> TYPE: PRT
<213> ORGANISM: Artificial Sequence
<220> FEATURE:
<223> OTHER INFORMATION: CD44-targeted polypeptide

<400> SEQUENCE: 3

Gln Glu Thr Trp Phe Gln Asn Gly Trp Gln Gly Lys Asn Pro
1               5                   10

<210> SEQ ID NO 4
<211> LENGTH: 14
<212> TYPE: PRT
<213> ORGANISM: Artificial Sequence
<220> FEATURE:
<223> OTHER INFORMATION: CD44-targeted polypeptide

<400> SEQUENCE: 4

Lys Glu Lys Trp Phe Glu Asn Glu Trp Gln Gly Lys Asn Pro
1               5                   10

<210> SEQ ID NO 5
<211> LENGTH: 14
<212> TYPE: PRT
<213> ORGANISM: Artificial Sequence
<220> FEATURE:
<223> OTHER INFORMATION: CD44-targeted polypeptide

<400> SEQUENCE: 5

Lys Glu Gln Trp Phe Gly Asn Arg Trp His Glu Gly Tyr Arg
1               5                   10
```

```
<210> SEQ ID NO 6
<211> LENGTH: 24
<212> TYPE: PRT
<213> ORGANISM: Artificial Sequence
<220> FEATURE:
<223> OTHER INFORMATION: CD44-targeted polypeptide

<400> SEQUENCE: 6

Gln Ile Arg Gln Gln Pro Arg Asp Pro Pro Thr Glu Thr Leu Glu Leu
1               5                   10                  15

Glu Val Ser Pro Asp Pro Ala Ser
            20

<210> SEQ ID NO 7
<211> LENGTH: 8
<212> TYPE: PRT
<213> ORGANISM: Artificial Sequence
<220> FEATURE:
<223> OTHER INFORMATION: CD44-targeted polypeptide

<400> SEQUENCE: 7

Lys Pro Ser Ser Pro Pro Glu Glu
1               5

<210> SEQ ID NO 8
<211> LENGTH: 8
<212> TYPE: PRT
<213> ORGANISM: Artificial Sequence
<220> FEATURE:
<223> OTHER INFORMATION: CD44-targeted polypeptide

<400> SEQUENCE: 8

Asn Ala Ser Ala Pro Pro Glu Glu
1               5

<210> SEQ ID NO 9
<211> LENGTH: 9
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: CD44-targeted polypeptide
<220> FEATURE:
<221> NAME/KEY: MOD_RES
<222> LOCATION: 9..9
<223> OTHER INFORMATION: AMIDATION

<400> SEQUENCE: 9

Lys Pro Ser Ser Pro Pro Glu Glu Cys
1               5

<210> SEQ ID NO 10
<211> LENGTH: 9
<212> TYPE: PRT
<213> ORGANISM: Artificial Sequence
<220> FEATURE:
<221> NAME/KEY: MOD_RES
<222> LOCATION: 1..1
<223> OTHER INFORMATION: ACETYLATION
<220> FEATURE:
<223> OTHER INFORMATION: CD44-targeted polypeptide
<220> FEATURE:
```

```
<221> NAME/KEY: MOD_RES
<222> LOCATION: 9..9
<223> OTHER INFORMATION: AMIDATION

<400> SEQUENCE: 10

Asn Ala Ser Ala Pro Pro Glu Glu Cys
1               5
```